(12) United States Patent
Bhatnagar et al.

(10) Patent No.: US 9,686,813 B2
(45) Date of Patent: Jun. 20, 2017

(54) WIRELESS SERVICES GATEWAY

(71) Applicant: Ruckus Wireless, Inc., Sunnyvale, CA (US)

(72) Inventors: Hemant Bhatnagar, Bangalore (IN); Wayne Chuu, Sunnyvale, CA (US); Chetan Hebbalae, Sunnyvale, CA (US); Wei-Lun Huang, Sunnyvale, CA (US); Rajesh Kaliaperumal, Bangalore (IN); William Kish, Sunnyvale, CA (US); Yi-Nan Li, Sunnyvale, CA (US); Ronald Mok, Sunnyvale, CA (US); Vijikumar Nagaraja, Bangalore (IN); Venkatarao Palli, Bangalore (IN); Yogesh Ranade, Sunnyvale, CA (US); Ming-Jye Sheu, Sunnyvale, CA (US); Henry Tzeng, Sunnyvale, CA (US); You-Lin Yan, Sunnyvale, CA (US); Thomas Yu, Sunnyvale, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 67 days.

(21) Appl. No.: 14/466,074

(22) Filed: Aug. 22, 2014

(65) Prior Publication Data
US 2014/0362807 A1 Dec. 11, 2014

Related U.S. Application Data

(63) Continuation of application No. PCT/US2013/027701, filed on Feb. 25, 2013.
(Continued)

(51) Int. Cl.
*H04W 76/02* (2009.01)
*H04W 4/00* (2009.01)
(Continued)

(52) U.S. Cl.
CPC .......... *H04W 76/025* (2013.01); *H04W 4/00* (2013.01); *H04W 4/18* (2013.01); *H04W 12/06* (2013.01);
(Continued)

(58) Field of Classification Search
None
See application file for complete search history.

(56) References Cited

U.S. PATENT DOCUMENTS

| 6,970,909 B2 | 11/2005 | Schulzrinne |
| 7,016,360 B1 | 3/2006 | Dong |

(Continued)

OTHER PUBLICATIONS

PCT International Search Report of PCT/US13/27701; dated Jun. 20, 2013; (4 pgs.).
PCT Written Opinion of the International Searching Authority of PCT/US13/27701; dated Jun. 20, 2013; (7 pgs.).
(Continued)

*Primary Examiner* — Hong Cho
(74) *Attorney, Agent, or Firm* — DLA Piper LLP

(57) ABSTRACT

A system for integrating wireless service providers' core networks with Wi-Fi radios using a Wireless Services Gateway (WSG). The WSG can allow wireless device users to seamlessly connect to a network such as the internet using both cellular phone antennae as well as Wi-Fi radio antennae while still utilizing their preferred wireless service provider's core network system of billing, authenticating and policy decision making. This system can allow for data transmission of wireless devices through Wi-Fi instead of through cellular antennae, thus increasing bandwidth and data transmission rates.

18 Claims, 17 Drawing Sheets

Related U.S. Application Data

(60) Provisional application No. 61/603,198, filed on Feb. 24, 2012.

(51) Int. Cl.
*H04W 4/18* (2009.01)
*H04W 88/10* (2009.01)
*H04W 88/16* (2009.01)
*H04W 84/04* (2009.01)
*H04W 12/06* (2009.01)

(52) U.S. Cl.
CPC ......... *H04W 84/045* (2013.01); *H04W 88/10* (2013.01); *H04W 88/16* (2013.01)

(56) References Cited

U.S. PATENT DOCUMENTS

| | | | |
|---|---|---|---|
| 8,116,264 B2* | 2/2012 | Lim | H04L 65/1026 370/328 |
| 2009/0070337 A1* | 3/2009 | Romem | G06F 17/30575 |
| 2010/0041364 A1* | 2/2010 | Lott | G06Q 30/016 455/404.1 |
| 2010/0185537 A1* | 7/2010 | Bari | G06Q 30/04 705/34 |
| 2012/0036361 A1* | 2/2012 | Tyhurst | H04L 67/34 713/168 |

OTHER PUBLICATIONS

PCT International Preliminary Report on Patentability of PCT/US13/27701; dated Aug. 26, 2014; (1 pg.).

\* cited by examiner

WIRELESS SERVICES GATEWAY

CROSS REFERENCE TO RELATED CASES

This application claims priority from and is related to international PCT application PCT/U.S.13/27701 filed 25 Feb. 2013 which claims priority from U.S. provisional application 61/603,198 filed 24 Feb. 2012, which are hereby incorporated by reference in their entirety.

TECHNICAL FIELD

The present subject matter generally relates to the integration of Wi-Fi and cellular technology. More specifically, the subject matter relates to allowing mobile users to utilize both systems to manage synchronous and asynchronous data connections.

BACKGROUND

Current wireless devices use much greater amounts of bandwidth than the cellular telephone infrastructure can handle efficiently. And although Wi-Fi technology allows for greater bandwidth, the radios are not well integrated into existing cellular telecommunications core.

SUMMARY

What is disclosed includes a system for integrating access point radios into a wireless service provider core network. The system may include a wireless services gateway configured to, communicate with at least one access point radio. Wherein the access point radio is configured to communicate with at least one wireless user equipment, communicate with at least one wireless service provider core network, communicate with at least one other wireless services gateway, access a distributed storage device that the at least one other wireless services gateway also has access to, and provide a communication connection between the at least one access point radio and a network. Optionally, the network is the internet.

Additionally, in some embodiments, the wireless services gateway is further configured to allow the wireless user equipment to move among more than one access point radio and maintain the network connection. And the wireless services gateway could be further configured to allow the wireless user equipment to move among more than one access point radio and cellular antennae and maintain the network connection. Further, in some embodiments, the wireless services gateway is further configured to replace the at least one other wireless services gateway if the at least one other wireless services gateway fails.

In certain embodiments, the wireless services gateway includes a data log interface, configured to, communicate with the at least one access point radio data log interface, communicate with a local log, and communicate with an event handler.

Optionally, in some examples, the wireless services gateway includes a communication service module, configured to, communicate with an Access Point Configuration Manager in the at least one access point radio, communicate with an Access Point Status Manager in the at least one access point radio, communicate with an Association Manager in the at least one access point radio, and communicate with a Distributed Memory Core and the distributed storage device.

Further, in some embodiments, the wireless services gateway includes a Tunnel Termination Gateway (TTG), Packet Data Gateway (PDG), Authentication/Authorization/Accounting (AAA) Proxy and a Simple Network Management Protocol (SNMP). And in some embodiments, the TTG, PDG, AAA Proxy and SNMP are all configured to communicate with the distributed storage device.

In certain example embodiments disclosed here, the wireless services gateway includes a Secure Gateway, wherein the secure gateway is configured to communicate with the distributed storage device and at least one access point radio. Additionally, for example, the wireless services gateway could include a femtocell gateway, wherein the femtocell gateway is configured to communicate with a femtocell access point radio.

In some examples, the wireless user equipment is at least one of a smartphone, a tablet computer, and a laptop computer. Additionally, the access point radio could be at least one of a Wi-Fi access point and a femtocell access point.

Certain example embodiments disclosed here include a method for integrating access point radios into a wireless service provider core network. This method could include, via a wireless services gateway, communicating with at least one access point radio, wherein the access point radio is configured to communicate with at least one wireless user equipment, communicating with at least one wireless service provider core network, communicating with at least one other wireless services gateway, accessing a distributed storage device that the at least one other wireless services gateway also has access to, and providing a communication connection between the at least one access point radio and a network.

In certain examples, the network is the internet. Further, in some examples, the method includes via the wireless services gateway, allowing the wireless user equipment to move among more than one access point radio and maintain the network connection.

Some example embodiments have the method including replacing the at least one other wireless services gateway if the at least one other wireless services gateway fails. Also via a data log interface, included in the wireless services gateway, communicating with the at least one access point radio data log interface, communicating with a local log, and communicating with an event handler.

Some embodiments include where the wireless services gateway includes a femtocell gateway, and the femtocell gateway is configured to communicate with a femtocell access point radio. Additional examples include wherein the wireless user equipment is at least one of a smartphone, a tablet computer, and a laptop computer.

Some embodiments include a method of establishing a data path comprising, via a wireless services gateway, receiving authentication protocol from a user equipment via an access point radio, communicating with a server, receiving authentication approval from the server, sending authentication approval to the wireless user equipment, via the access point radio, receiving at least one data transmission communications from the user equipment via the access point radio, wherein at least one of the data transmissions is a Dynamic Host Configuration Protocol (DHCP) message requesting an Internet Protocol (IP) address, requesting a session from a Data Service Gateway, for the user equipment, receiving a message regarding an IP address assigned to the user equipment, from the Data Service Gateway, and sending a message regarding the assigned IP address to the user equipment, via the access point radio.

Examples also include where the server is a home server which is at least one of a home location registry server and a home subscriber server. Also, the method may include where the session requested from the Data Service Gateway is at least one of, a Gateway General Packet Radio Service (GPRS) Support Node (GGSN), Packet Data Network Gateway (PGW), mobile IP Foreign Agent and a Home Agent. Additionally, the method may include where the Data Service Gateway is part of a wireless service provider core network.

Examples disclosed here also include where the method has the message regarding the IP address assigned to the user equipment from the Data Service Gateway is at least one of a create Packet Data Protocol (PDP) context response and a mobile IP registration response. Further examples have the message regarding the assigned IP address to the user equipment further includes the wireless services gateway IP address and the wireless services gateway subnet mask.

Some examples include establishing a tunnel, via the wireless services gateway, between the wireless services gateway and the data service gateway. Some examples also have where the tunnel is at least one of a GPRS Tunneling Protocol (GTP), Layer 2 Tunneling Protocol (L2TP), and IP-IP tunnel.

In some examples, the access point radio is at least one of a Wi-Fi access point and a femtocell access point. Also the server could be is a radius server. And if so, the radius server could be in communication with a home server. Also, the home server could be at least one of a home location registry server and a home subscriber server.

Some example embodiments here also include a system for establishing a data path. This system could include a wireless services gateway, configured to, receive authentication protocol from a user equipment via an access point radio, communicate with a server, receive authentication approval from the server, send authentication approval to the wireless user equipment, via the access point radio, receive at least one data transmission communications from the user equipment via the access point radio, wherein at least one of the data transmissions is a Dynamic Host Configuration Protocol (DHCP) message requesting an Internet Protocol (IP) address, request a session from a Data Service Gateway, for the user equipment, receive a message regarding an IP address assigned to the user equipment, from the Data Service Gateway, and send a message regarding the assigned IP address to the user equipment, via the access point radio.

This system could also include where the server is a home server which is at least one of a home location registry server and a home subscriber server. Also, the session requested could be from the Data Service Gateway is at least one of, a Gateway General Packet Radio Service (GPRS) Support Node (GGSN), Packet Data Network Gateway (PGW), mobile IP Foreign Agent and a Home Agent.

Additionally, this system could include wherein the Data Service Gateway is part of a wireless service provider core network. Also, the message regarding the IP address assigned to the user equipment from the Data Service Gateway could be at least one of a create Packet Data Protocol (PDP) context response and a mobile IP registration response.

Further, some examples include where the message regarding the assigned IP address to the user equipment further includes the wireless services gateway IP address and the wireless services gateway subnet mask. Examples embodiments may also deal with establishing a tunnel, via the wireless services gateway, between the wireless services gateway and the data service gateway.

Certain example embodiments include the tunnel that could be at least one of a GPRS Tunneling Protocol (GTP), Layer 2 Tunneling Protocol (L2TP), and IP-IP tunnel. Also, the access point radio could be at least one of a Wi-Fi access point and a femtocell access point. And, in some examples systems, the server is a radius server.

Some examples include in the system, the radius server which is in communication with a home server. Also, wherein the home server is at least one of a home location registry server and a home subscriber server.

Some example embodiments include a method of establishing a data path. This method could comprise, via a wireless services gateway, receiving authentication protocol from a user equipment via an access point radio, communicating with a home server, receiving authentication approval from the home server, sending authentication approval to the wireless user equipment, via the access point radio, sending a query to a policy server, regarding the policy rules for the authenticated wireless user equipment, receiving policy rules for the authenticated wireless user equipment, receiving at least one data transmission communications from the user equipment via the access point radio, wherein at least one of the data transmissions is a Dynamic Host Configuration Protocol (DHCP) message requesting an Internet Protocol (IP) address, requesting a session from a Data Service Gateway, for the user equipment, receiving a message regarding an IP address assigned to the user equipment, from the Data Service Gateway, sending a message regarding the assigned IP address to the user equipment, via the access point radio, routing data transmissions from the wireless user equipment, via the access point radios, using the policy rules from the policy server.

Some example embodiments also include wherein the policy server is a Policy Control Rule Function (PCRF) server. Also, this method could include wherein the access point radio is at least one of a Wi-Fi access point and a femtocell access point.

Certain example embodiments disclosed here include a system for establishing a data path comprising, a wireless services gateway, configured to, receive authentication protocol from a user equipment via an access point radio, communicate with a home server, receive authentication approval from the home server, send authentication approval to the wireless user equipment, via the access point radio, send a query to a policy server, regarding the policy rules for the authenticated wireless user equipment, receive policy rules for the authenticated wireless user equipment, receive at least one data transmission communications from the user equipment via the access point radio, wherein at least one of the data transmissions is a Dynamic Host Configuration Protocol (DHCP) message requesting an Internet Protocol (IP) address, request a session from a Data Service Gateway, for the user equipment, receive a message regarding an IP address assigned to the user equipment, from the Data Service Gateway, send a message regarding the assigned IP address to the user equipment, via the access point radio, route data transmissions from the wireless user equipment, via the access point radios, using the policy rules from the policy server.

Further, this example system could include where the policy server is a Policy Control Rule Function (PCRF) server. Also, the system access point radio could be at least one of a Wi-Fi access point and a femtocell access point.

Some example embodiments disclosed here also include a system for providing network access to wireless user equipment comprising, a wireless services gateway including at least a realm-aware radius proxy and a services gateway, the wireless services gateway configured to, communicate with at least one access point radio, wherein the at least one access point radio is configured to communicate with the at least one wireless user equipment, communicate with a wireless service provider core network, communicate with a wide area network, receive data communication requests from the wireless user equipment via the at least one access point radio, determine the wireless user equipment routing based on information other than SSID, and route the data traffic from the wireless user equipment, based on the determination.

Examples also include systems where the wide area network is the internet. Examples may also include where the determination of the wireless user equipment is based on AAA requests received by the wireless services gateway via the realm aware radius proxy.

Further, the system access point radio could be at least one of a Wi-Fi access point and a femtocell access point. And the system wireless user equipment could be at least one of a smartphone, a tablet computer and a laptop computer.

Some example embodiments include a method of providing network access to wireless user equipment comprising, via a wireless services gateway including at least a realm-aware radius proxy and a services gateway, communicating with at least one access point radio, wherein the at least one access point radio is configured to communicate with the at least one wireless user equipment, communicating with a wireless service provider core network, communicating with a wide area network, receiving data communication requests from the wireless user equipment via the at least one access point radio, determining the wireless user equipment routing based on information other than SSID, and routing the data traffic from the wireless user equipment, based on the determination.

Further, examples include wherein the wide area network is the internet. Some examples have features wherein the determination of the wireless user equipment is based on AAA requests received by the wireless services gateway via the realm aware radius proxy.

Also, some examples have the access point radio is at least one of a Wi-Fi access point and a femtocell access point. And this method could include wireless user equipment that is at least one of a smartphone, a tablet computer and a laptop computer.

Certain example embodiments here include a system for routing data communications, comprising, a wireless services gateway configured to, communicate with at least one access point radio, communicate with at least one wireless service provider core network, communicate with at least one wide area network, receive data traffic from a wireless user equipment, via the at least one access point radio, and route the data traffic, received from the wireless user equipment via the access point radio, to the at least one wide area network via a breakout.

Example embodiments of this system may include the breakout which is at least one of, an AP breakout between the access point radio and the wireless services gateway, a breakout at the wireless services gateway, a breakout between the wireless services gateway and the at least one wireless service provider core network, and a breakout after the wireless service provider core network.

Some embodiments of this system include the data traffic including Service Set Identification (SSID). In these examples, the wireless services gateway could further be configured to determine the data traffic routing based on the SSID.

In some examples of this system the access point radio is at least one of a Wi-Fi access point and a femtocell access point. In some, the wireless services gateway is further configured to communicate with the access point radio regarding the policy to use the AP breakout.

Certain embodiment examples include a method for routing data communications, comprising, via a wireless services gateway, communicating with at least one access point radio, communicating with at least one wireless service provider core network, communicating with at least one wide area network, receiving data traffic from a wireless user equipment, via the at least one access point radio, and routing the data traffic, received from the wireless user equipment via the access point radio, to the at least one wide area network via a breakout.

In some embodiments of this method, the breakout is at least one of, an AP breakout between the access point radio and the wireless services gateway, a breakout at the wireless services gateway, a breakout between the wireless services gateway and the at least one wireless service provider core network, and a breakout after the wireless service provider core network.

Some examples of this method include the data traffic as Service Set Identification (SSID). Also, example embodiments include via the wireless services gateway, determining the data traffic routing based on the SSID. And, via the wireless services gateway, communicating with the access point radio regarding the policy to use the AP breakout.

Embodiments disclosed herein may include a method of providing access to a wireless service provider core network, comprising, via a wireless services gateway, communicating with a Wi-Fi access point, allowing a wireless user equipment, communicating via the Wi-Fi access point, to acquire an Internet Protocol (IP) address from a Dynamic Host Configuration Protocol (DHCP) server regardless of Wi-Fi authentication, allowing the user equipment to browse a web page via an Hyper Text Transfer Protocol (HTTP) request by redirecting the HTTP request to a web portal server in the wireless core network for authentication, obtaining authentication information from the web portal server regarding the user equipment, and forwarding the authentication information to a Authentication/Authorization/Accounting (AAA) server in the wireless core network for authentication.

Some example embodiments include a system for providing access to a wireless service provider core network, comprising, a wireless services gateway, configured to, communicate with a Wi-Fi access point, allow a wireless user equipment, communicating via the Wi-Fi access point, to acquire an Internet Protocol (IP) address from a Dynamic Host Configuration Protocol (DHCP) server regardless of Wi-Fi authentication, allow the user equipment to browse a web page via an Hyper Text Transfer Protocol (HTTP) request by redirecting the HTTP request to a web portal server in the wireless core network for authentication, obtain authentication information from the web portal server regarding the user equipment, and forward the authentication information to a Authentication/Authorization/Accounting (AAA) server in the wireless core network for authentication.

Some example embodiments here include a system for authenticating a wireless user equipment with a wireless service provider core network, comprising, a wireless services gateway configured to, communicate with at least one Access Point (AP), the AP configured to communicate with at least one wireless user equipment, receive Dynamic Host Configuration Protocol (DHCP) messages from the wireless user equipment, provide a first Internet Protocol (IP) address to the wireless user equipment via standard DHCP protocol, allow the wireless user equipment to authenticate itself with an intended web page server, establish a connection between the wireless user equipment and a Data Service Gateway, in order to acquire a second IP address for the wireless user equipment, maintain the connection between the wireless user equipment IP address from DHCP and the address assigned by the Data Service Gateway, receive a packet from the wireless user equipment, change the source of the IP address assigned by the Data Service Gateway, encapsulate the received packet in at least one of a GTP, IPIP, and GRE Tunnel, send the encapsulated packet to the Data Service Gateway, receive a packet from the Data Service Gateway, decapsulate the received packet, replace the destination IP of the decapsulated packet with the first assigned IP address, send the decapsulated IP packet to the wireless user equipment.

Some examples of this system include the Data Service Gateway which can be at least one of a Gateway General Packet Radio Service (GPRS) Support Node (GGSN), a Packet Data Gateway (PGW) and a Home Agent from the wireless service provider core network.

Certain example embodiments herein include a method of authenticating a wireless user equipment with a wireless service provider core network, comprising, via a wireless services gateway, communicating with at least one Access Point (AP), the AP configured to communicate with at least one wireless user equipment, receiving Dynamic Host Configuration Protocol (DHCP) messages from the wireless user equipment, providing a first Internet Protocol (IP) address to the wireless user equipment via standard DHCP protocol, allowing the wireless user equipment to authenticate itself with an intended web page server, establishing a connection between the wireless user equipment and a Data Service Gateway, in order to acquire a second IP address for the wireless user equipment, maintaining the connection between the wireless user equipment IP address from DHCP and the address assigned by the Data Service Gateway, receiving a packet from the wireless user equipment, changing the source of the IP address assigned by the Data Service Gateway, encapsulating the received packet in at least one of a GTP, IPIP, and GRE Tunnel, sending the encapsulated packet to the Data Service Gateway, receiving a packet from the Data Service Gateway, decapsulating the received packet, replacing the destination IP of the decapsulated packet with the first assigned IP address, sending the decapsulated IP packet to the wireless user equipment.

In some embodiments, this method may include the Data Service Gateway as at least one of a Gateway General Packet Radio Service (GPRS) Support Node (GGSN), a Packet Data Gateway (PGW) and a Home Agent from the wireless service provider core network.

Embodiments here also include a system for authenticating a wireless user equipment with a wireless service provider core network, comprising, a wireless services gateway configured to, communicate with at least one Access Point, the Access Point configured to communicate with at least one wireless user equipment, receive a Dynamic Host Configuration Protocol (DHCP) request from the wireless user equipment, assign an Internet Protocol (IP) address to the wireless user equipment, wherein the IP address is from a pre-allocated IP address that is routable at least one of a GGSN, PGW, and Home Agent in the wireless service provider core network, send the assigned IP address to the wireless user equipment via a DHCP offer/acknowledge message, allow the wireless user equipment to access the internet via a redirected communication link to a Web Portal Server in the wireless services provider core network, allow the wireless user equipment to authenticate with an Authentication server in the wireless services provider core network, wherein if authentication occurs, establish a tunnel with a Data Service Gateway by informing the Data Service Gateway of the assigned IP, receive a packet from the wireless user equipment, encapsulate the packet and send the packet to the Data Service Gateway, without changing the wireless user equipment IP address receive a packet from the Data Service Gateway, and decapsulate the packet and send the packet to the wireless user equipment without changing the wireless user equipment IP address.

Optionally, the system disclosed includes the Data Service Gateway as at least one of a Gateway General Packet Radio Service (GPRS) Support Node (GGSN), a Data Service Gateway and a Home Agent from the wireless service provider core network. Further, the wireless services gateway could be further configured to, if authentication does not occur, revoke the wireless user equipment DHCP offer/acknowledge message. And the DHCP offer/acknowledge message may be a DHCP lease.

Some examples here include a method of authenticating a wireless user equipment with a wireless service provider core network, comprising, via a wireless services gateway, communicating with at least one Access Point, the Access Point configured to communicate with at least one wireless user equipment, receiving a Dynamic Host Configuration Protocol (DHCP) request from the wireless user equipment, assigning an Internet Protocol (IP) address to the wireless user equipment, wherein the IP address is from a pre-allocated IP address that is routable at least one of a GGSN, PGW, and Home Agent in the wireless service provider core network, sending the assigned IP address to the wireless user equipment via a DHCP offer/acknowledge message, allowing the wireless user equipment to access the internet via a redirected communication link to a Web Portal Server in the wireless services provider core network, allowing the wireless user equipment to authenticate with an Authentication server in the wireless services provider core network, wherein if authentication occurs, establish a tunnel with a Data Service Gateway by informing the Data Service Gateway of the assigned IP, receiving a packet from the wireless user equipment, encapsulating the packet and send the packet to the Data Service Gateway, without changing the wireless user equipment IP address, receiving a packet from the Data Service Gateway, and decapsulating the packet and send the packet to the wireless user equipment without changing the wireless user equipment IP address.

In some examples with this method, the Data Service Gateway is at least one of a Gateway General Packet Radio Service (GPRS) Support Node (GGSN), a Data Service Gateway and a Home Agent from the wireless service provider core network. Also, examples may also include via the wireless services gateway, wherein if authentication does not occur, revoking the wireless user equipment DHCP offer/acknowledge message, and wherein the DHCP offer/acknowledge message is a DHCP lease.

Certain embodiments include a system for providing network access to wireless user equipment comprising, a wireless services gateway, the wireless services gateway including at least two cores, the at least two cores configured to process at least one flow of data traffic, the wireless services gateway configured to, receive the at least one flow and process the flow according to a table of data, communicate with at least one access point radio, wherein the at least one access point radio is configured to communicate with the at least one wireless user equipment, communicate with a wireless service provider core network, communicate with a wide area network, receive data communication requests from the wireless user equipment via the at least one access point radio, and route the flow of data traffic from the wireless user equipment, based on the table of data.

Certain embodiments include a method of providing network access to wireless user equipment comprising, via a wireless services gateway, the wireless services gateway including at least two cores, the at least two cores configured to process at least one flow of data traffic, receiving the at least one flow and process the flow according to a table of data, communicating with at least one access point radio, wherein the at least one access point radio is configured to communicate with the at least one wireless user equipment, communicating with a wireless service provider core network, communicating with a wide area network, receiving data communication requests from the wireless user equipment via the at least one access point radio, and routing the flow of data traffic from the wireless user equipment, based on the table of data.

BRIEF DESCRIPTION OF THE DRAWINGS

For a better understanding of the technology described in this application, reference should be made to the Description below, in conjunction with the following drawings in which like reference numerals refer to corresponding parts throughout the figures.

DETAILED DESCRIPTION

Figure 1:
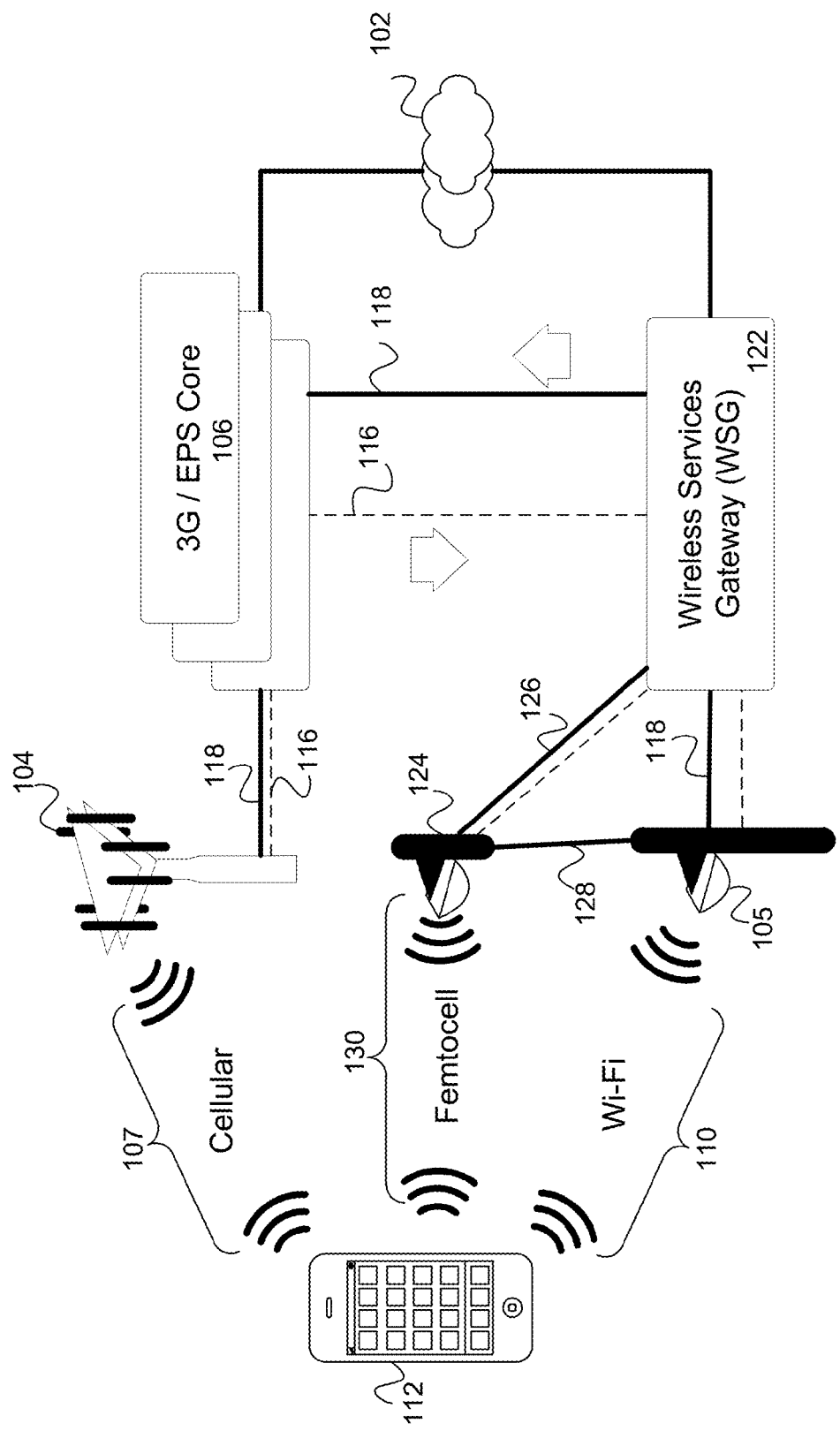
FIG. 1 is an illustration of Mobile/Wi-Fi Network Services, the radio antennae interface between the mobile device and the telecommunications core network, according to some embodiments.

It is to be understood that the Figures and descriptions of the present technology have been simplified to illustrate elements that are relevant to understand the technology, while eliminating, for the purpose of clarity, many other elements found in communication systems and methods. Those of ordinary skill in the art may recognize that other elements and/or steps are desirable and/or required in implementing the present technology. However, because such elements and steps are well known in the art, a discussion of such elements and steps is not provided here. This disclosure is however, directed to all such variations and modifications to such elements and methods known to those skilled in the art.

Overview

Wireless device users demand high data transmission rates, large bandwidth and good service. The existing cellular antennae infrastructure may have trouble sufficiently handling this demand by the data users. The existing cellular infrastructure was created to handle voice calls and little data. Using the current cell antennae infrastructure for high amounts of data traffic may result in low bandwidth, poor connectivity, and low data transmission rates.

Wi-Fi antennae can be utilized to handle the higher demand for data transmissions. ("Wi-Fi" is a trademark of the Wi-Fi Alliance and the brand name for products using the IEEE 802.11 family of standards.) Wi-Fi radios are much better equipped to handle large amounts of data transmissions than cellular radios, although their range can be shorter than cellular radio ranges.

And Wi-Fi is an option because many wireless User Equipment (UE) can use both: longer range cellular telephone radios as well as shorter range Wi-Fi radios through integrated transceivers: cellular antenna as well as Wi-Fi antenna. Such example UEs can be any number of devices including, for example, smart phones, laptops, tablet computers, automobiles equipped with integrated communication devices, or any equipment that communicates wirelessly.

But in the current deployment of Wi-Fi, each Wi-Fi Access Point (AP) is locally tied to a proprietary network located, for example in a home, office or small entity network such as a corner coffee shop. The result is that these smaller networked Wi-Fi APs connect to their own proprietary networks requiring individual authentication, payment and billing systems run by the individual proprietary network owner and operator. Further, these proprietary networks prohibit transition between APs as the UE moves. They also prohibit transitions between and among short-range radio networks and cellular networks.

One example solution is to widely deploy Wi-Fi Access Points (APs) at strategic locations to collectively reach hundreds or thousands of users at a time. Through this Wi-Fi deployment, the demand for high volume data is better handled than through the cellular infrastructure. Those Wi-Fi APs could be linked into the overall cellular core network already provided by numerous companies as wireless service providers.

Thus, the Wi-Fi APs, incorporated with the existing cellular core network authentication, could more effectively work with the cellular core networks. The existing wireless services provider(s) core network policies and billing systems could be integrated work with locally deployed Wi-Fi APs. Such a system could create an integrated infrastructure which could allow seamless roaming between Wi-Fi and existing cellular antenna all while being serviced and billed by any and all of the existing UEs wireless service providers, such as AT&T, Verizon or Vodafone.

A Wireless Services Gateway (WSG) according to embodiments described below can provide examples ways to integrate cellular and Wi-Fi systems. And by using such an integrated system, an example subscriber to a cellular phone provider, such as AT&T, could use a UE to access the internet and send and receive data over both existing cell tower antennae or locally deployed Wi-Fi antenna. For example, as the UE physically moves, the example system could hand off the UE's among Wi-Fi APs and cellular tower antennae, and back and forth as the UE moves through respective radio coverage and comes within communication range of different transceivers. Additionally, for example, the UE could select use to Wi-Fi for data transmissions. The result of that, could be a decrease on the burden of data transmissions over cellular tower antennae and increased data transmission performance by the UEs by switching to Wi-Fi, and the end UE user could still be billed by the users' subscribed service provider.

Further, the individual Wi-Fi APs need not be completely owned by one service provider, but could be owned by a third party that allows access to one or more service providers' core networks, or any combination thereof. Thus, one Wi-Fi AP could service multiple companies' customers, and tie into each of their own core networks. Or, service providers could share APs or even arrange roaming type agreements to service one another's customers with their own APs.

FIG. 1 Overview System Diagram

FIG. 1 depicts an example high-level diagram of how an overall system can be structured including a UE interfacing with multiple types of antennae resources, Wi-Fi, Femtocell and cellular, for example, and their interaction with the WSG and the associated core network(s), according to some embodiments. These portions of the system will be described in greater detail below, as will the interfaces between the portions and some exemplary alternate embodiments of them.

FIG. 1 shows, at a high level, how the UE 112 can communicate with many different kinds of antennae. In this non-limiting example, the UE is communicating with an example Wi-Fi AP 105 using Wi-Fi protocol 110, such as 802.11 standard, as well as cellular towers 104 using cellular protocol 107 and Femtocell antennae via femtocell protocol 130. Here, UE 112 can be any number of devices that communicate wirelessly such as a cell phone, a smart cell phone, a laptop computer, a tablet computer, automobile equipped with transceivers, or any other number of wireless devices. In some embodiments, the traffic coming into the WSG need only be IP traffic from a UE and the particular path to the WSG is not important. For example, the US could be wired to the network.

For example, when a UE 112, is in use, it may utilize both voice and data transmissions. But cellular antennae, 104 are better configured to handle telephone calls, not data transmissions. Thus, when multiple UEs are utilizing a cellular antennae 104, the system may overload and slow service. This type of overloading and slow service is how many existing UEs 112 access the internet 102, through the cellular antennae 104 and the existing cellular core network 106.

However, Wi-Fi antennae, such as the AP 105 may be better at handling large data transmissions then cellular towers. And this example Wi-Fi AP 105 can be integrated via a Wireless Services Gateway, WSG 122 with an existing cellular core network 106 and also the internet 102. This core network 106 can contain certain billing, authentication, and policy protocols to handle the subscribers' UEs 112 through existing wireless service systems. The WSG 122 can also connect the UEs 112 with the internet 102. By use of the WSG, the user can utilize both Wi-Fi APs and cellular antennae while maintaining a subscription plan with just one wireless services provider.

It should also be noted that in in some embodiments, the WSG 122 is able to connect with and coordinate with more than one core wireless services provider networks 106. Shown as an illustrative example only, are three different 3G/EPS Cores 106. Thus, in this example, the system can, handle UEs who subscribe to more than one wireless services provider, such as AT&T and Verizon and Vodafone. In this way, more than one network operator, or Multiple Network Operators (MNO) may be handled. The system could utilize different associated SSIDs to direct the data and control paths to the various MNO cores. Although three 3G/EPS Cores are shown, the number could be less or more than three.

The APs can broadcast an SSID or "Service Set Identifier" that identifies an ESS or "Extended Service Set." The BSSID or "Basic Service Set Identification" is a MAC address associated with the AP. The 802.11 standard is Wi-Fi but the system and methods associated described herewith could support any kind of future radio functionality. SSIDs and MNOs are discussed in greater detail below.

For illustration purposes, as in this example, the core is styled as a 3G/EPS Core 106 but could be any cellular core network, even considering future networks such as 4G, LTE, or future networks. These types of networks can also be referred to more generically as mobile packet cores, which may be broader than just cellular systems.

As another example embodiment, a femtocell antenna, 124, is shown. Here, the femtocell antennae 124, can either communicate directly to the WSG 122 as shown in communication line 126, or to a local Wi-Fi AP 105, shown on communication line 128. This communication line can be hard wired, such as an Ethernet connection, or via a wireless connection back haul. The femtocell 124 and the Wi-Fi AP 105 could be provided as an integrated unit.

Thus, FIG. 1 depicts an example integration of an existing cellular core network 106 with Wi-Fi APs 105 through the WSG over transmission connections 116 and 118. Communication path 116 shows an example data flow from the cellular core network 106 to the WSG 122 and communication connection 118 is the data flow from the WSG 122 to the cellular core network 106 and their associated radio antennae. This architecture can allow the UE 112 to utilize any depicted antennae, the cellular 104, the Wi-Fi AP 105 or the femtocell antennae 124, or any combination thereof, and can still be properly handled by the wireless service providers to provide service to the internet 102 or voice calls and also bill the customer, handle policies and service. In some embodiments, either or both of the communications path 118 and 126, can have intermediary nodes or elements (for example, nodes acting relays in a mesh topology).

Integration with Multiple Network Operators

FIG. 1 also depicts embodiments illustrating the Wireless Services Gateway's 122 of a Service Provider (SP) handling of multiple Mobile Network Operators (MNOs), according to some embodiments. In this example embodiment, many different UEs that each subscribe to different MNOs such as AT&T, Verizon, Vodafone or Orange, all utilize the Wi-Fi networks integrated with the WSG 122 to the appropriate MNO's core network.

An MNO may be different than a Service Provider in a situation where a third entity administers the infrastructure of a network and leases use of that infrastructure to service providers. Or, an MNO could be the same as a Service Provider if one entity accomplishes both the infrastructure administration and the service as well.

Each UE can use an SSID to communicate with an AP. Associated with that SSID can be information about which wireless service provider, Mobile Network Operator, that particular UE is configured to use. Alternatively, an SSID can be associated with a particular MNO. In a further alternative, an SSID in combination with other information (such as user identity, device information (e.g., a device MAC address)) can be used to identify the particular MNO to which the UE is subscribed.

Through the Wi-Fi AP, and through any type of communication network, the WSG 122 may be contacted. The SSID can inform the WSG 122 as to which MNO the particular UE is configured to use and the WSG 122 can then route the transmissions appropriately, through to the appropriate MNO core network. Additionally, any number of MNOs could be utilized, each over their own communication path respectively.

Alternatively, MNOs can establish roaming contracts with one another where UEs utilize the APs of MNOs to which they are not subscribed but their service provider has an agreement. Thus, the UEs can have coverage in more areas, freeing the MNOs to scale back the number of actual and physical APs, just as they do with cellular tower antennae.

Another embodiment of such a setup could include the SSID of a particular business or venue, such as a Retailer Partner. In this embodiment, an SP wants to utilize a physical business or Retailer Partner location in which to place an AP. The Retailer Partner SSID, for example, can be deployed as an additional SSID that can provide advertisements for the Retailer Partner. The SP can utilize the same AP to advertise other SSIDs for the SP's own subscribers.

Figure 2:
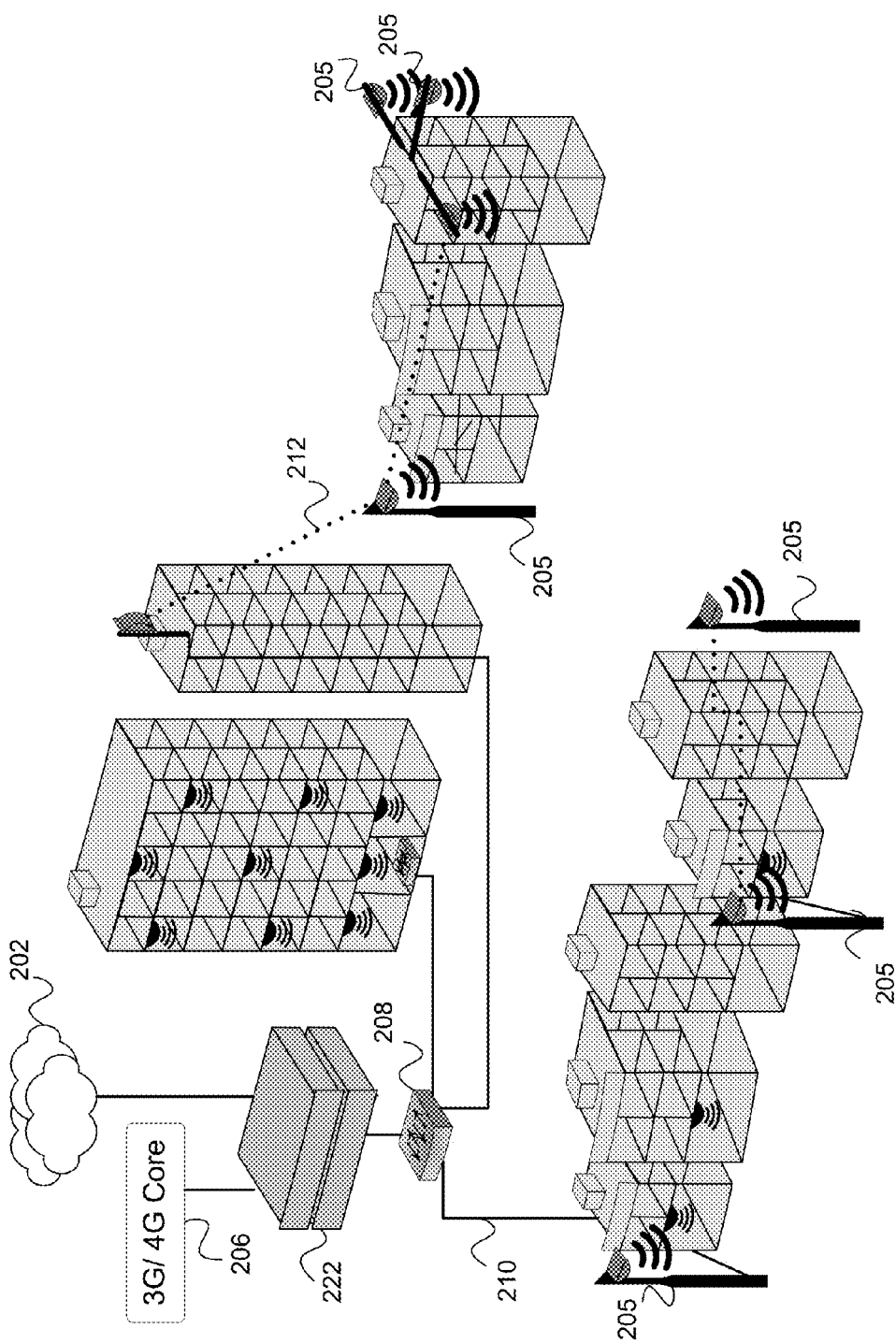
FIG. 2 is a Network Overview, an illustration of deployment of the wireless system gateway in different physical environments, according to some embodiments.

FIG. 2 Deployment of APs

Focusing now on AP deployment, FIG. 2 is an illustration of an example deployment of the system in various physical environments, according to some embodiments. As depicted in FIG. 2, multiple Wi-Fi APs 205 may be scattered throughout different indoor and outdoor locations. They may be tied to one another and a router 208 by both land lines 210 and/or wireless connections 212. The router 208 may be in communication with the Wireless Services Gateway (WSG) 222 which may integrate the Wi-Fi infrastructure with an existing wireless services provider core network 206, here depicted as an example as 3G or 4G core, discussed in more detail later in this disclosure. The WSG may also connect the Wi-Fi infrastructure with the internet 202. The WSG 222 can be similar to the WSG 122.

A user using this system in FIG. 2 could connect a UE through any of the various APs 205 to access the internet 202 through their existing wireless subscriber through their core network 206. As the user moved between APs 205, the UE would be handed off to the different APs seamlessly, both indoors and/or outdoors.

Using Wi-Fi Back Haul to Support a Core Cellular Network Front End

An alternate embodiment of the system depicted in FIG. 2 would be to utilize Wi-Fi back haul to support a proprietary cellular network front end. For instance, current systems utilize the core cellular network communications back haul to support a front end Wi-Fi connection. But in the embodiment described herein, that arrangement is reversed. Instead, the back haul could be Wi-Fi connections and the front end user connection could be cellular antennae or actual Wi-Fi APs. Thus, as shown in FIG. 2, the wireless backhaul 212 could be Wi-Fi all the way back to the router, but the front end APs could be either Wi-Fi APs or cellular antennae (not shown). The cellular antennae can communicate with a user device and then the communications can be converted to Wi-Fi traffic for transmission back to the router (one example of this is a femtocell). Any combination of Wi-Fi back haul and core cellular network back haul could be utilized.

Figure 3:
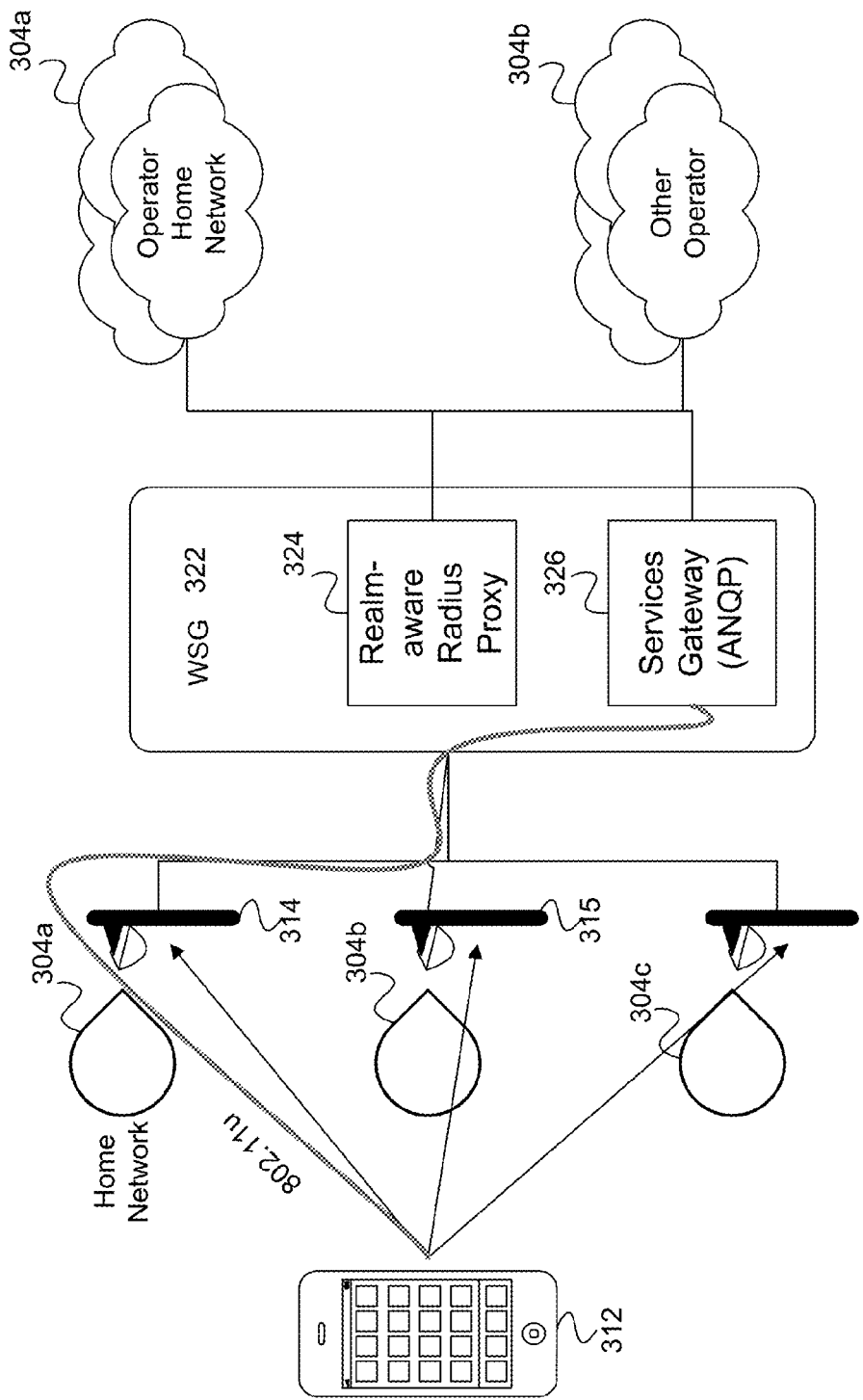
FIG. 3 is an illustration of the use of overall system for a network operator providing services for multiple Mobile Virtual Network Operators utilizing 802.11u/ANQP capabilities, according to some embodiments.

FIG. 3 Single SSID Usage

Focusing now on how a WSG system routes data traffic, one example embodiment is shown in FIG. 3. In this embodiment, instead of multiple SSIDs used by multiple wireless service providers, one SSID is used by all UEs 312. Each AP could broadcast each individual SSID that it services in order to find UEs for that particular SSID and associated service providers. However, this approach may use excessive computing resources. Instead, in this example embodiment, the AP can broadcast one SSID for all service providers. Although FIG. 3 might imply that the UE 312 can simultaneous reach all service provider networks, this is for simplicity and logical description of the embodiments. For example, the service provider coverage areas 304a, 304b, and 304c can be physically separated by long distances and the UE 312 may only be within a single coverage area at a given time. One example of the use of a single SSID that could support multiple service provides could be given, for example, in 802.11u and/or HotSpot 2.0 standard.

With only one SSID used, (for example when a UE 312 supports a single SSID functionality, who is a subscriber of service provider 304b, can detect the single SSID functionality support in the SSID of service provider 304a. UE 312 can use an ANQP protocol to query if its service provider is supported by the SSID. When UE 312 receives confirmation that its service provider 304b is reachable via this SSID, it can perform regular authentication using a credential from service provider 304b. WSG 322 can use a Realm-aware AAA service component 324 to route an authentication request to service provider 304b.

The Realm Aware Radius Proxy 324 can direct AAA requests to the proper Operator Home Network 304a or 304b using the realm information, such as that derived from the user name field, in the AAA requests. This realm-based decision can be applied to directing UE traffic to the applicable Operator Home Network 304a or 304b.

In one instance, AP 314 is broadcasting SSID of service provider 304a, and AP 315 is broadcasting SSID of service provider 304b. When UE 312 detects the SSID of 304b, which is its home network, UE 312 authenticates to the WSG 322 without performing ANQP query 326.

Figure 4:
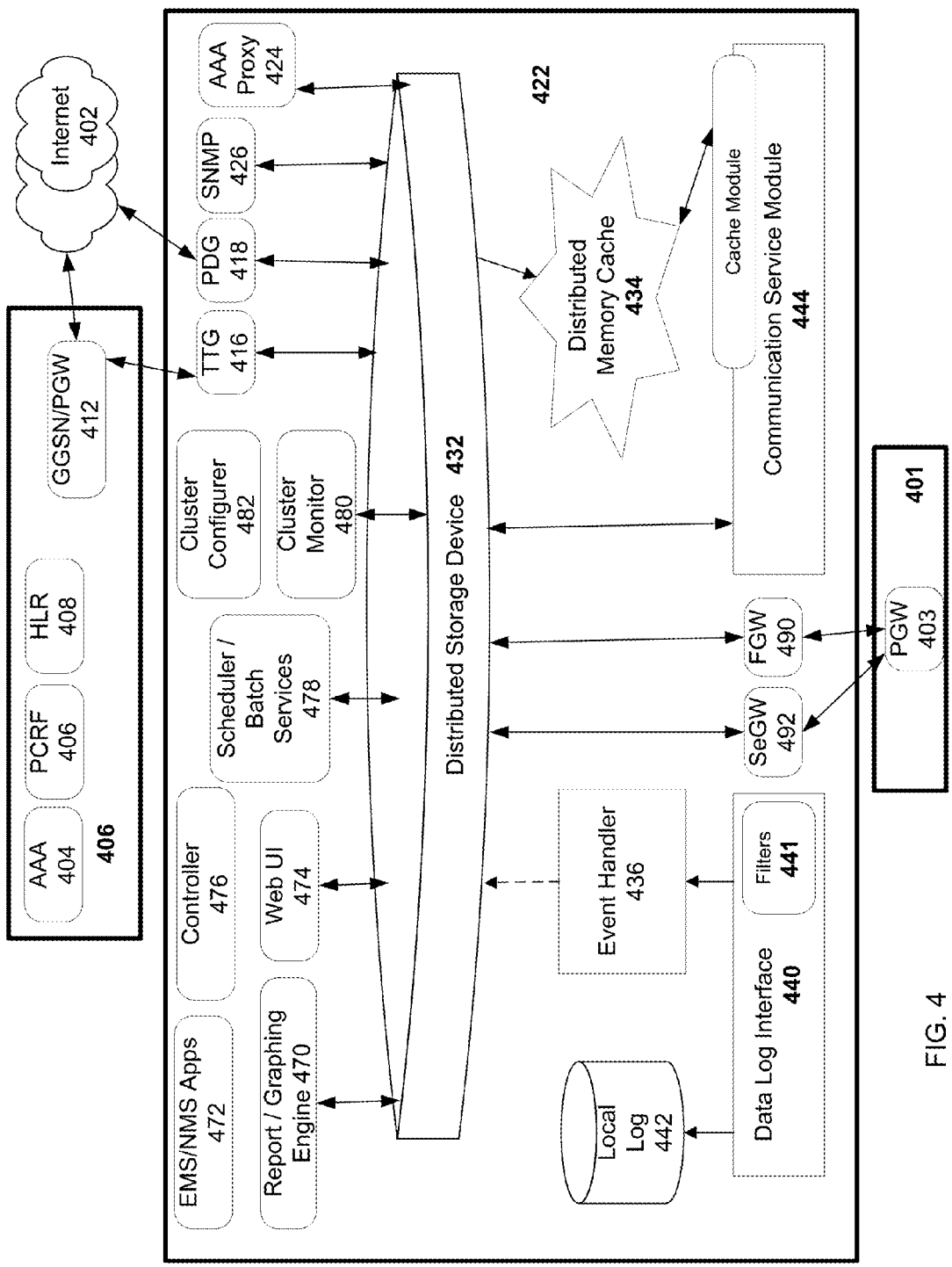
FIG. 4 is an illustration of the Wireless Services Gateway Box components, according to some embodiments.

FIG. 4 More Detail of the WSG

Focusing now on the WSG itself, FIG. 4 is an example illustration of a WSG 422, which can provide capabilities to control, manage and maintain a network consisting of one or more WSG nodes, as well as Wi-Fi access points, according to some embodiments. Through the WSG, in this way, the Wi-Fi APs can provide a front end to the existing cellular network core. Multiple WSGs working together can be called a cluster.

An EMS/NMS Application module 472, can contain subsystems to collectively provide Fault, Configuration, Accounting, Performance, Security (FCAPS) management capabilities in an Element and Network management system.

A Controller module 476, can contain subsystems that provide various controller activities such as AP/Client association managements, Tunnel management, Mesh management, Radio Frequency (RF) management, AAA integration, Roaming handlers, to help control and/or manage the Wi-Fi access points.

A Report/Graphing Engine 470 can be responsible for visualizations and illustrations of the information collected by the WSG node 422 regarding the various aspects of the network elements and resources such as the Wi-Fi access points.

A Web UI module 474 can be responsible for providing web user interfaces for an example end user to access and control the WSG network.

A Scheduler/Batch Services module 478, can be responsible for scheduling, and execution of various tasks in WSG node 422, such as statistics collection, data aggregation, AP discovery/association.

A Cluster Configurer module 482, can be responsible for the configuration of a WSG node 422 that is related to the management of the membership of the WSG node in a WSG cluster.

A Cluster Monitor module 480 in the WSG node 422 can be responsible for the detection of the health status of the WSG nodes 422 in a WSG cluster. It can communicate with peer modules 480 of other WSG nodes 422 as well as detect errors of the WSG nodes 422, and can perform error resolution as well as notification of the failures to other modules in the WSG system, which might further trigger fail over, take back operations for fault tolerance capabilities in the WSG.

Further shown in the WSG 422 are additional embodiment features such as a Femtocell Gateway FGW 490. The FGW 490 could be used if a femtocell AP 401 is part of the example network, and integrated into the wireless service provider core network. Also depicted as an additional embodiment is a Secure Gateway SeGW 492. A SeGW 492 could be used to establish an IP/Sec Tunnel (not pictured) with an AP of any type. The SeGW 492 and FGW 490 are configured to communicate with a Packet Data Network Gateway (PGW) in a femtocell AP 401.

WSG Interfaces with Wireless Service Providers Core Network

Continuing with FIG. 4 also shows an illustration of the Wireless Services Gateway's 422 interactions with a core wireless service provider's core networks 406.

The example wireless service provider core network 406 is depicted—along with the interfaces that the core itself can have with the WSG 422. For instance, a WSG 422 including Tunnel Termination Gateway (TTG) 416 function, a Packet Data Gateway PDG 418 function, a AAA Proxy 424 function and an SNMP 426 function. The TTG 416 is depicted in communication with a Gateway GPRS Support Node (GGSN/P-GW) 412 and from there, the internet 402. The PDG 418 is depicted interfacing directly with the internet 402 as well. Although one PDG, AAA Proxy and TTG are shown, there could be multiple instances of each.

Three representative core network components are shown as well, a AAA server 404, Policy Controller (PCRF) 406 and Home Location Registry (HLR) 408. These core network components are depicted in the wireless service provider's core 406.

Figure 5:
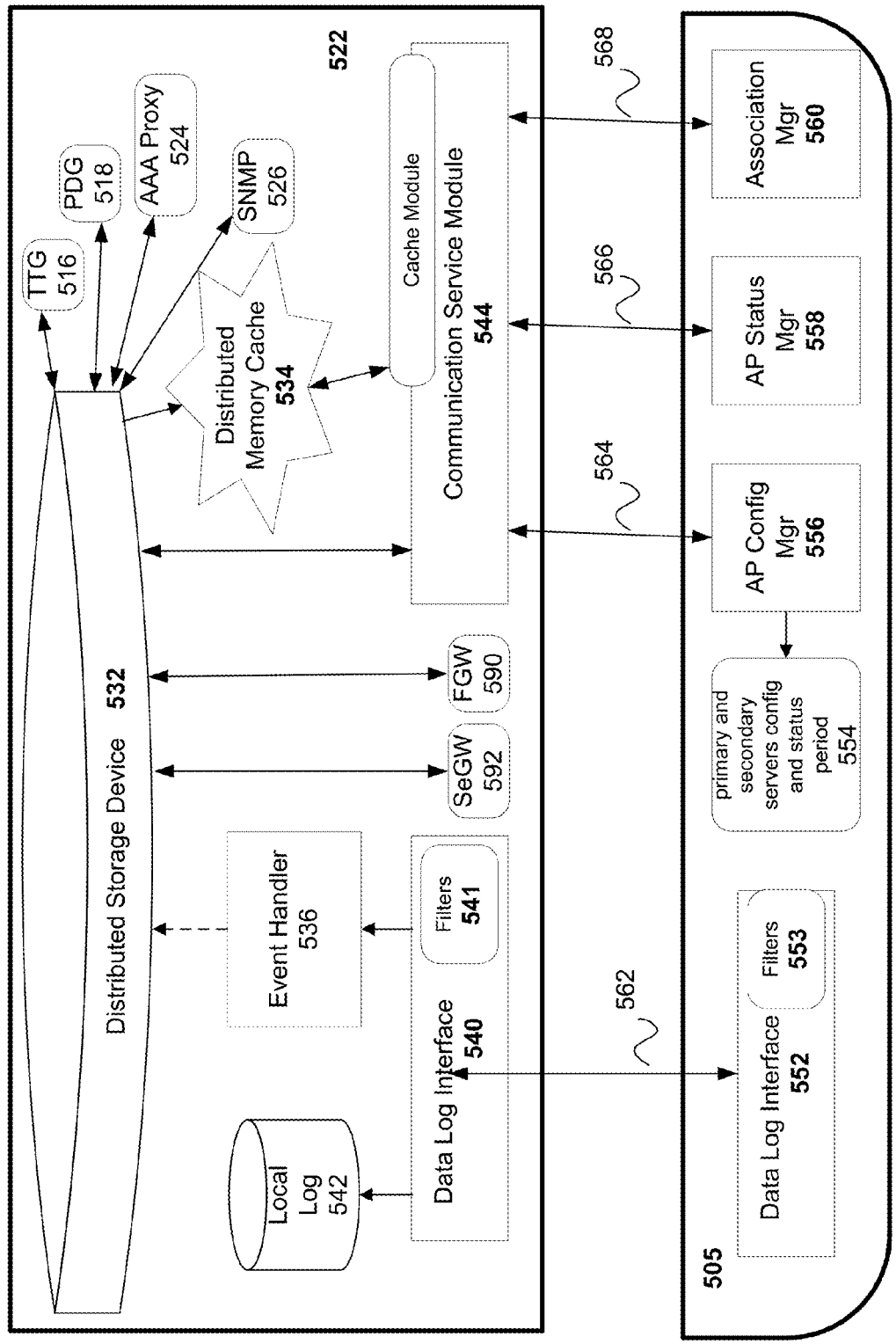
FIG. 5 is an illustration of the Wireless Services Gateway Box components, the interface between the access points and the Wireless Services Gateway node, according to some embodiments.

FIG. 5 WSG Interfaces with APs

Focusing now on the interface between the Wi-Fi APs 505 and the example WSG 522, is FIG. 5. Here an example interface between the access points 505 and the Wireless Services Gateway node 522 are shown with one Wi-Fi access point 505, but more than one AP could be similarly arranged. Here, this example AP 505, has various interfaces to the WSG 522, according to some embodiments. For instance, a Data Log Interface is depicted on the access point side as 552, which interfaces with the corresponding Data Log Interface 540 on the WSG side over communication path 562. Corresponding filters for the Data Log Interface are depicted as 553 on the access point side and 541 in the WSG 522.

The module 522, illustrates one example WSG node, which can be within an example WSG cluster, which can be responsible for providing persistence service, controller services, as well as an example Element Management System/Network Management System (EMS/NMS) services to the network elements including Wi-Fi access points 505 in this figure.

A Distributed Storage Device 532 can provide persistence services for any modules in the WSG node 522, as well as the Wi-Fi access point 505. It represents one instance of a database node, which can participate in a cluster of multiple nodes, to form a virtual big data store for the overall system. In this way, WSG clusters can provide redundancy and fail-safe options, by using distributed storage device 532.

A Distributed Memory Cache 534 may serve as a transient storage of information for the Wi-Fi access points 505, as well as a front end cache for the persistence information in the Distributed Storage Device 532, to improve performance of data access.

A Communication Service Module 544, may provide various interfaces to the Wi-Fi access points 505, and may internally make use of the Distributed Memory Cache 534, as well as the Distributed Storage Device 532 to provide the services. It can be responsible for some communications to and from the Wi-Fi access point 505, for example, and can participate in activities such as discovery, association, health status, configurations, performance statistics, and data collections, for example.

Messages related to configuration information 564 of the access point 505 can be handled by the Communication Service Module 544 in the WSG Node 522. A corresponding configuration manager module in the Wi-Fi access point 505, the AP Config Mgr 556, may periodically check for the availability of any new configuration information, such that it can fetch and update its own configuration upon any detected changes.

Messages 566 can be communicated from the access point 505, to the Communication Service Module 544, to report the access point 505 own health status. These communications can take place over any number of example communication lines or paths including hardwired or wireless.

Further depicted are example are messages 568 which can be exchanged between the access point 505, and the Communication Service Module 544, for completing the initial discovery and association of the access point 505 with the WSG Node 522.

An AP Config Mgr 556 in the access point 505 is also shown, which can be responsible for managing the life cycles of the configuration information in the access point, including, but not limited to, the synchronization of the information with the WSG Node 522, periodically checking for updates, as well as retrieving, applying and making effective the latest revision of the configuration information in the access point 505. The AP Config Mgr 556 may also communicate with the WSG 522 for a full or partial list of other WSG nodes available in the cluster.

Also depicted is an Association Mgr 560 in the access point 505, which may be responsible for handling the association activities between the access point and its associated WSG node 522. Upon startup, the Association Manager 560 can consult a module 554 to get, for example, a list of WSG nodes 522 in the cluster that are valid for it to communicate with, and attempt to register itself into the overall WSG system. Upon successful association, the Association Mgr 560 may trigger a download of various information such as the certificates for authentication and future encryption of communication traffic with the WSG node 522, as well as software/firmware and configuration information from the WSG node 522.

An AP Status Manager 558 in the access point 505 can be responsible for reporting the status of the access point to the WSG system, through any WSG Node 522 in the cluster. The module 554 in the access point 505 can maintain a list, for example, of the WSG nodes 522 that are valid for the access point to communicate with.

The Data Log Interface module 540 in the WSG node 522 can serve the data log requests from the corresponding Data Log Interface module 552 in the access point 505. It can work with Filters 541 to determine how to handle incoming messages, where some of them can be directed towards a Local Log module 542 for simple logging operations, while others can be directed to an Event Handler 536 for further manipulation and processing, which potentially could transform into other internal persistent messages such as event, and alarms in the Distributed Storage Device 532.

Certain filers in the Filters 541 can be applied to incoming Data Log messages handled by the Data Log Interface Module 540, can determine the subset of messages to be further processed by the Event Handler 536.

The Local Log module 542 can make data log messages forwarded by the Data Log Interface module 540 become persistent, which can be further utilized to analyze the network activity.

Messages 562 from the Data Log Interface module 552 in the access point 505, to the Data Log Interface module 540 in the WSG node 522, may contain various information regarding the Wi-Fi access point 505 itself, as well as information regarding the access point help reported on behalf of the status of the network or the UEs that it is helping to serve.

The Data Log Interface module 552 in the access point 505, can send report event messages to the corresponding Data Log Interface module 540 in the WSG node 522. It can work with a Filter 553 to determine, for example, what messages can be forward to the WSG node 522.

The Filters 553 can include filters used by the Data Log Interface module 552 in the access point 505, that can determine, for example, the subset of messages that shall be forward to the WSG node to report various status information of the access point 505.

Figure 6:
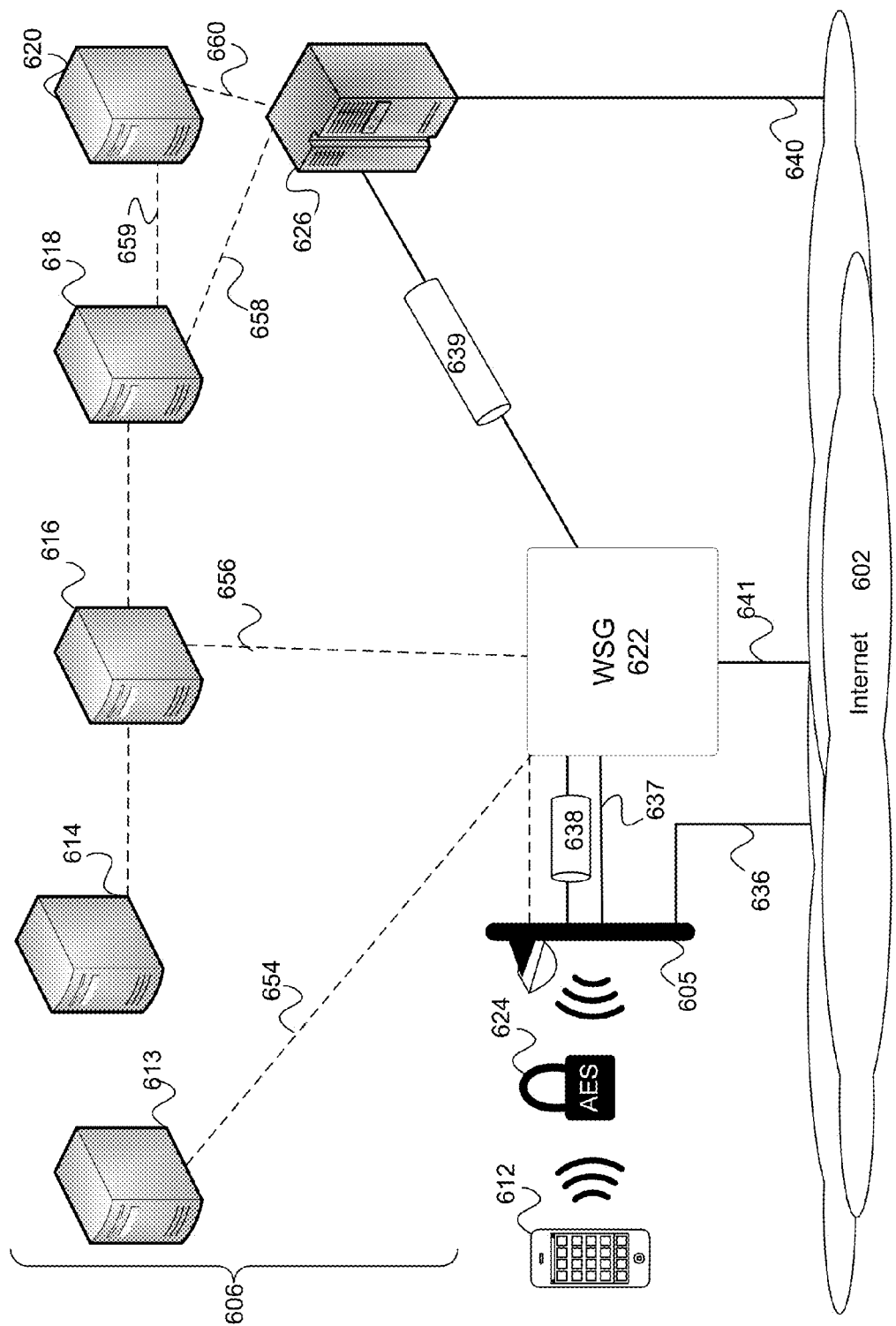
FIG. 6 is an illustration of one embodiment of System Level Integration overview, how the Wireless Services Gateway connects the mobile device, through the access point including the telecom core network and internet breakouts where Authentication, Authorization and Accounting (AAA) Proxy is utilized to support integration with a telecommunications core network, according to some embodiments.

FIG. 6 First Alternate Embodiment Authentication Example: WSG as Proxy

Example embodiments will now be described utilizing different core network arrangements and architectures, in order to provide service to the UE end user device. An entire system overview, from APs to the WSG to an example core network, for example, can be seen in FIG. 6 which is an example illustration of one way the WSG 622 connects the mobile device 612, through the core network of the cellular core network 606. Here, the UE 612 can communicate over a set of encrypted transmissions, for example, Advanced Encryption Standardization (AES) 624 through the AP 605 with the WSG 622 according to some embodiments. And in this example embodiment, the WSG can act as a Proxy Server for the APs 605.

The cellular core network 606 may contain numerous servers that are used to handle the UE's transmissions, prioritize them, bill them, and authenticate them.

The AP 605 may be connected by connection 637 to the WSG 622. In some embodiment, communications between the AP 605 and the WSG 622 can be made using a secure IPSec Tunnel 638. It is through WSG 622 that the cellular core network 606 can be linked to the Wi-Fi AP 605.

As depicted in FIG. 6, the WSG 622 can directly communicate to a OSS/NMS Network Management Systems server 613 over a connection 654 and an Authentication Authorization and Accounting (AAA) Proxy server 616 over a connection 656. The AAA Proxy server 616 can communicate with the Authentication server, such as a Home Location Registry (HLR) 614, and a PCRF Policy server 618. The use of the AAA Proxy server 616 can shield the core network servers from direct connection with the WSG 622 and is one way wireless service providers can communicate with third parties. Although shown in a single server AAA Proxy server 616 can be implemented as one or more servers. The embodiments described show simple integration of WSG 622 and AP 624 with one or more of the mobile packet core elements, including but limited to, HLR 614, PCRF 618, and an OCS/OFCS/CGF Billing and Charging server 620.

The PCRF Policy server 618 can communicate directly with the OCS/OFCS/CGF Billing and Charging server 620 via link a 659. In this embodiment a Data Service Gateway 626 can be in direct communication with both the OCS/OFCS/CGF Billing and Charging server 620 and the PCRF Policy server 618 via links 660 and 658 respectively.

The PCRF Policy server, 618 may dictate, for example, how UE's transmissions are handled and, for example pass that information to the WSG 622. For instance, depending on the call, or the type of traffic, the PCRF Policy server 618 can direct the WSG 6222 to utilize a local breakout 636 to the internet 602 from the AP 605, this can be used, for example, when it is not desired that the WSG process the packet. Alternatively, or in addition to, the WSG 622 could utilize its own local breakout 641 to the internet 602 depending on the policy information received from the PCRF Policy server 618. The UE's transmissions can be routed through a tunnel 639 to the Data Service Gateway 626 and there to the internet 602 over communication 640. The tunnel 639 can be a GTP tunnel, for example.

The embodiments described can permit a user to be authenticated, billed and the particular policies associated with the account can be referenced and executed, via connection with the AP 605 instead of through a cellular tower antenna infrastructure. Here, the WSG 622 can interact with the various servers in cellular core network, for example, using AAA Proxy server 616.

Figure 7:
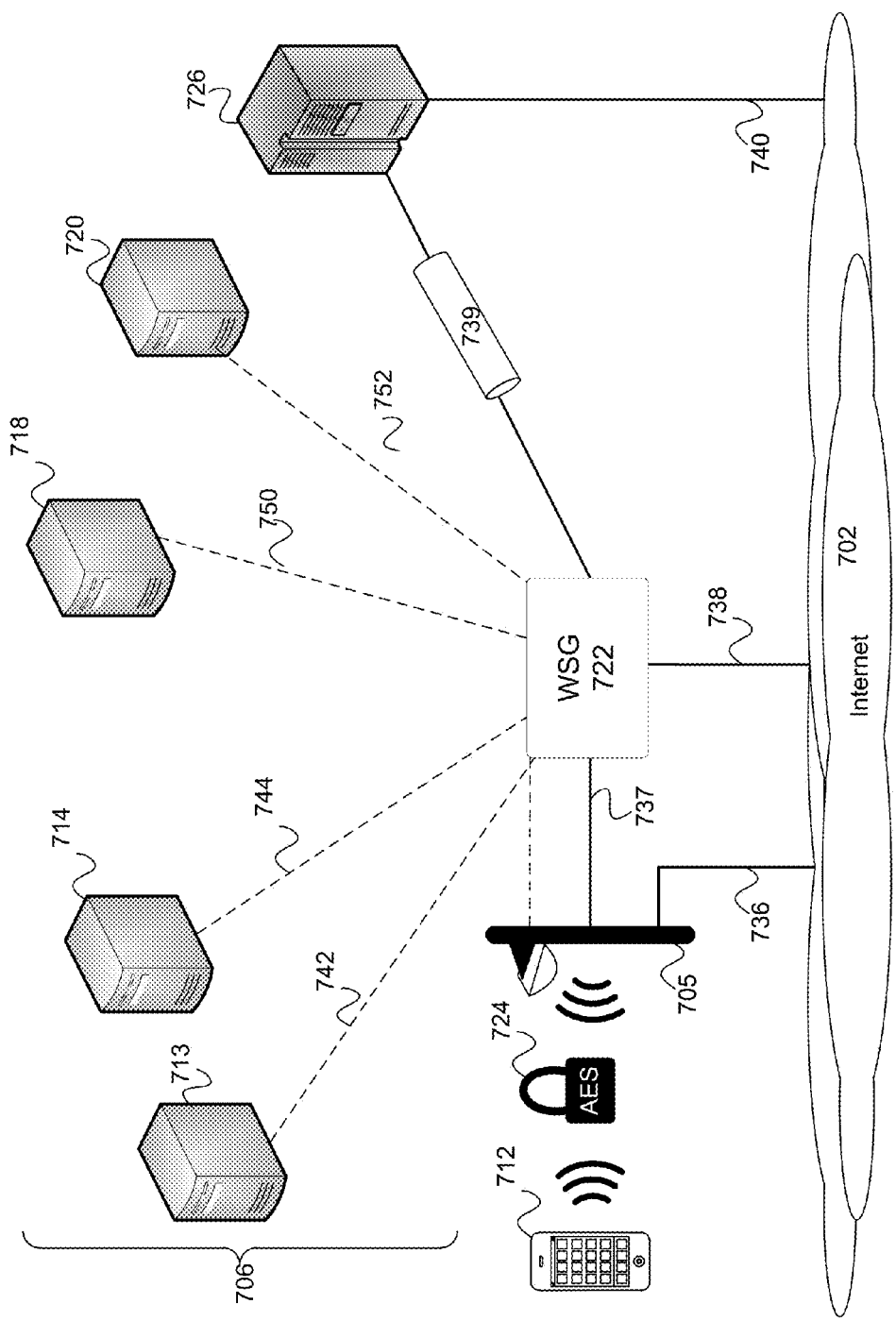
FIG. 7 is an alternative embodiment of FIG. 6 where the WSG connects to a telecommunications core network directly instead of utilizing a AAA Proxy, according to some embodiments.

FIG. 7 WSG as Radius Server

In some embodiments, the WSG can communicate directly with one or more servers in the cellular core network without connecting through a proxy server. For example, FIG. 7 illustrating another way the WSG 722 can connect the UE 712, with the cellular core network 706. In these embodiments, for example, the WSG 722 can communicate directly with one or more authentication servers without having to go through a AAA Proxy. In particular, WSG 722 can communicate directly with OSS/Network Management Services 713, HLR 714, PCRF 718 and Charging Gateway Function (CGF) 720 via communication paths 742, 744, 750 and 752 respectively.

Figure 8:
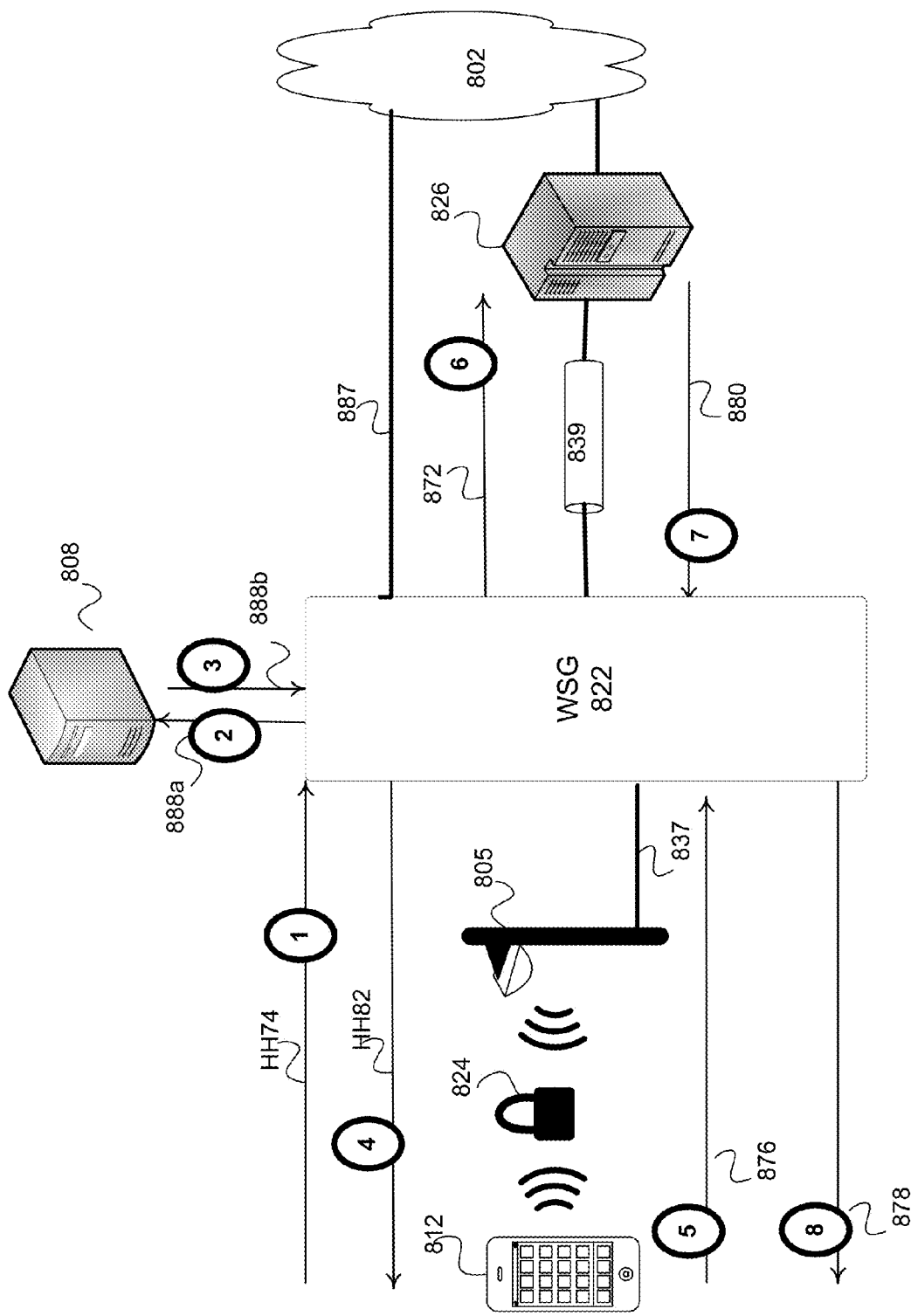
FIG. 8 is a system diagram of one embodiment of Integration, the steps 1-5 illustrating the operation of the Wireless Services Gateway system according to some embodiments, according to some embodiments.

FIG. 8 Timeline: Embodiment with WSG as Radius Server

The disclosure will now step through various examples of how an exemplary connection may be made using various embodiments disclosed herein. Thus, FIG. 8 is a system diagram of example steps 1-8 illustrating the operation of the WSG system according to some embodiments.

In this embodiment, UE 812, communicates with the AP 805. This Access point can use protocol 824 which can be authentication protocol 802.1X/EAP over Wi-Fi link, for example, although other authentication protocols could be used. (e.g. Pre-Shared Key (PSK))

Step 1 is labeled 874 and shows a RADIUS/EAP Authentication Request that can be used between UE 812 and the WSG 822 via AP 805.

Step 2 is labeled 888a and shows the WSG 822 communicating with a Home Location Registry (HLR) server or a Home Subscriber Server (HSS), 808. The HLR, used for 3G technology or HSS, used for 4G/LTE technology would both normally be part of the cellular core network and authenticates the UE as being a subscriber to a particular service. These could generically be referred to as any kind of authentication server for future technologies.

Step 3 is labeled 888b and can return the authentication information from the authentication server 808 back to the WSG 822.

Step 4, 882 is the communication of the WSG 822 to the UE 702, using protocol 824, that it has been authenticated and may begin sending and receiving data.

Step 5, 876 can be a data transmission to the WSG 822, from the UE 812, after authentication, specifically, communication 876 can denote Dynamic Host Configuration Protocol (DHCP) messages from UE requesting an IP address.

Step 6, communication 8772, denotes a "create session request" to acquire an IP address from Data Service Gateway, 826, for the UE. For example, this request can also be called "create PDP context request," or "mobile IP registration request." The Data Service Gateway, 826 can also be a part of the internet service provider's cellular core network. It can be, for example, a GGSN, P-GW (PDN-GW or Packet Data Network Gateway), mobile IP Foreign Agent, (FA), or Home Agent (HA).

Step 7, communication 880, denotes a "create session response" including the IP address assigned to UE 812, from Data Service Gateway, 826. For example, this response can also be called "create PDP context response," or "mobile IP registration response."

Step 8, communication 878, denotes DHCP messages from WSG 822, which can contain the IP address of the UE, 812 provided by the Data Service Gateway 826.

Data Service Gateway 826 as a GGSN can provide the IP address used by UE 812 but may not include a default gateway IP address and subnet mask as part of the GTP Packet Data Protocol (PDP) create PDP context response. Typically, a GGSN does not provide a default gateway since it normally contemplates direction connections to it. However, in Step 8, a UE needs to know the default gateway's IP address and subnet mask in order to determine an appropriate destination Media Access Control (MAC) address for outgoing IP traffic from the UE 812. In particular, if a DHCP message is used in Step 8, the WSG can include both a default gateway IP address and subnet mask along with the assigned IP address, where both of them may not be provided from the communications over 872 and 880. At least two mechanisms can address this issue in the context of supporting the integration with Data Service Gateway 826.

First, use the UE's IP address assigned by Data Service Gateway 826 can be used as the default gateway IP address; and mask length of 32 can be used for IPv4 addresses and 128 for IPv6 address.

Or, second, the WSG 822 can form a subnet mask based on the assigned IP address and choose an unused address in the subnet as the default gateway. In one embodiment, if UE's assigned IP address, represented in a 32-bit string of 0 and 1s string ends with 01: the WSG can use the same prefix but a suffix of 10 as the default gateway's IP address, and can use a mask length of 30 for IPv4 addresses, and 126 for IPv6 addresses. If UE's assigned IP address, ends with 10: the WSG 822 can use the same prefix but a suffix of 01 as the gateway's IP address, and use a mask length of 30 for IPv4 addresses, and 126 for IPv6 addresses. If a UE's assigned IP address ends with 00 or 11: the WSG 822 can use the same prefix but use a suffix of 01 as the gateway IP address. The mask length (29 or greater for IPv4) will be set to form the smallest subnet encompassing both the UE's IP address and the generated default gateway IP address.

Once a UE 812 is associated with the AP, the UE's DHCP request can be intercepted by the AP or WSG, and the IP address allocated by GTP-C can be returned back to UE as a DHCP response.

A tunnel 839 may be established to the Data Service Gateway 826 and from there, to the internet 802. For example, tunnel 839 could utilize GTP, L2TP, IP-IP or any standard tunneling protocol utilized by Data Service Gateway 826.

The WSG 822 can support the features of a TTG as a "Proxy GSN," to transport UE 8702 traffic. The WSG 822 can support one or more of the following network elements: including IP addressing, AAA, Billing, QoS enforcement, etc.

The WSG 822 can be connected to both a Gn, via 839, and a Gi/Wi interface between 826 and 802, or directly to the internet via 887 for UE traffic.

In embodiments described herein, the UE 812, may not need to be aware of the existence of core network elements (for example, 3G16 network elements), and can be managed by the WSG via either Open or 802.1X authentications, and can support DHCP for address allocation, gateway and DNS settings.

Figure 9:
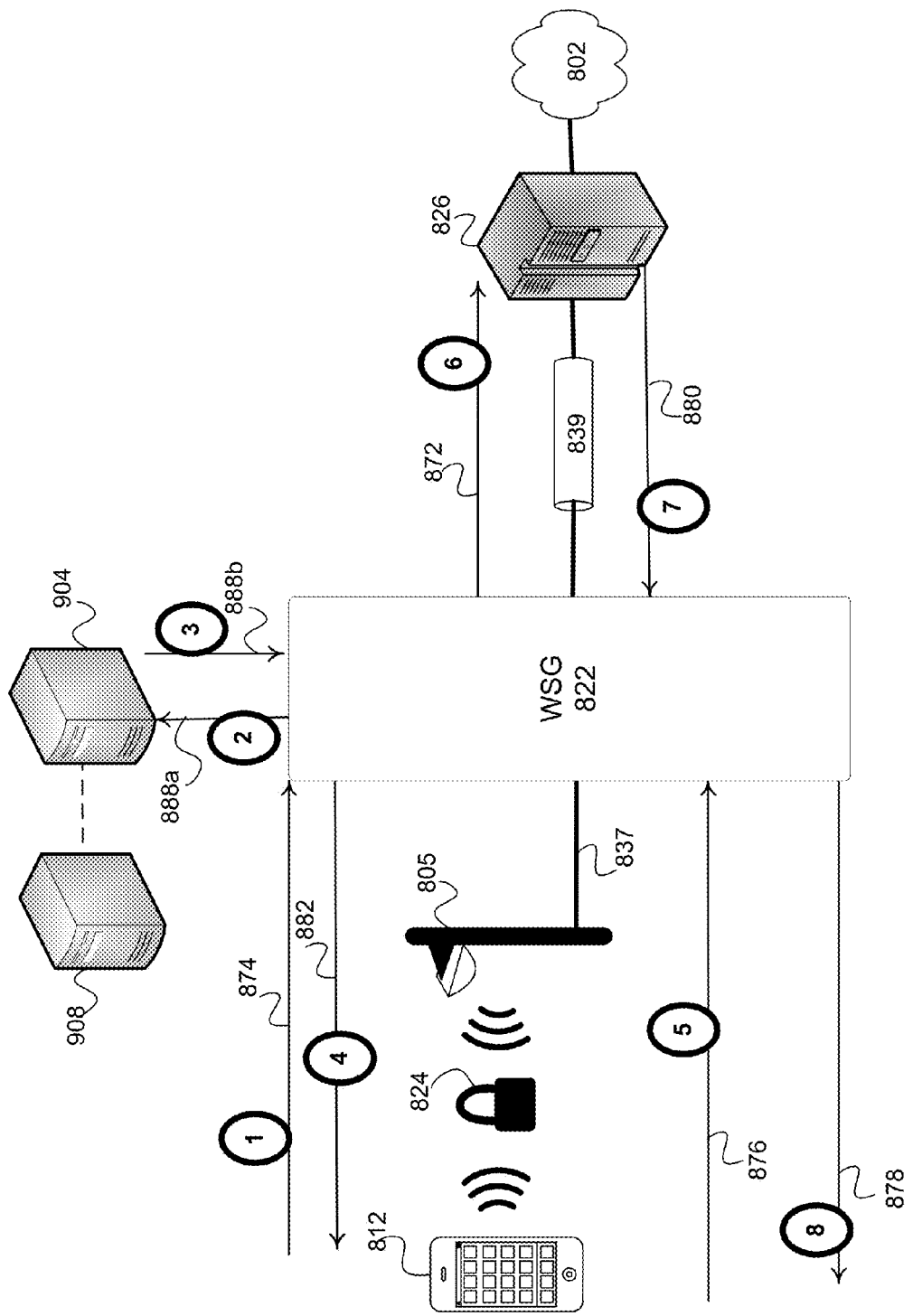
FIG. 9 is an alternate embodiment of FIG. 8 except authentication does not go directly to the HLR server but through a RADUIS Server Proxy, according to some embodiments.

FIG. 9 Embodiments with WSG as Proxy

FIG. 9 is a variation example of FIG. 8, a system diagram of the steps illustrating the operation of the WSG system according to some embodiments.

FIG. 9 shows the operation of a Radius server, 904 as a proxy for the HLR 908. This is used when cellular phone carriers do not want third parties communicating directly with their HLR. These proxies stand in between the WSG, 922 for example, and the HLR 908, here.

Figure 10:
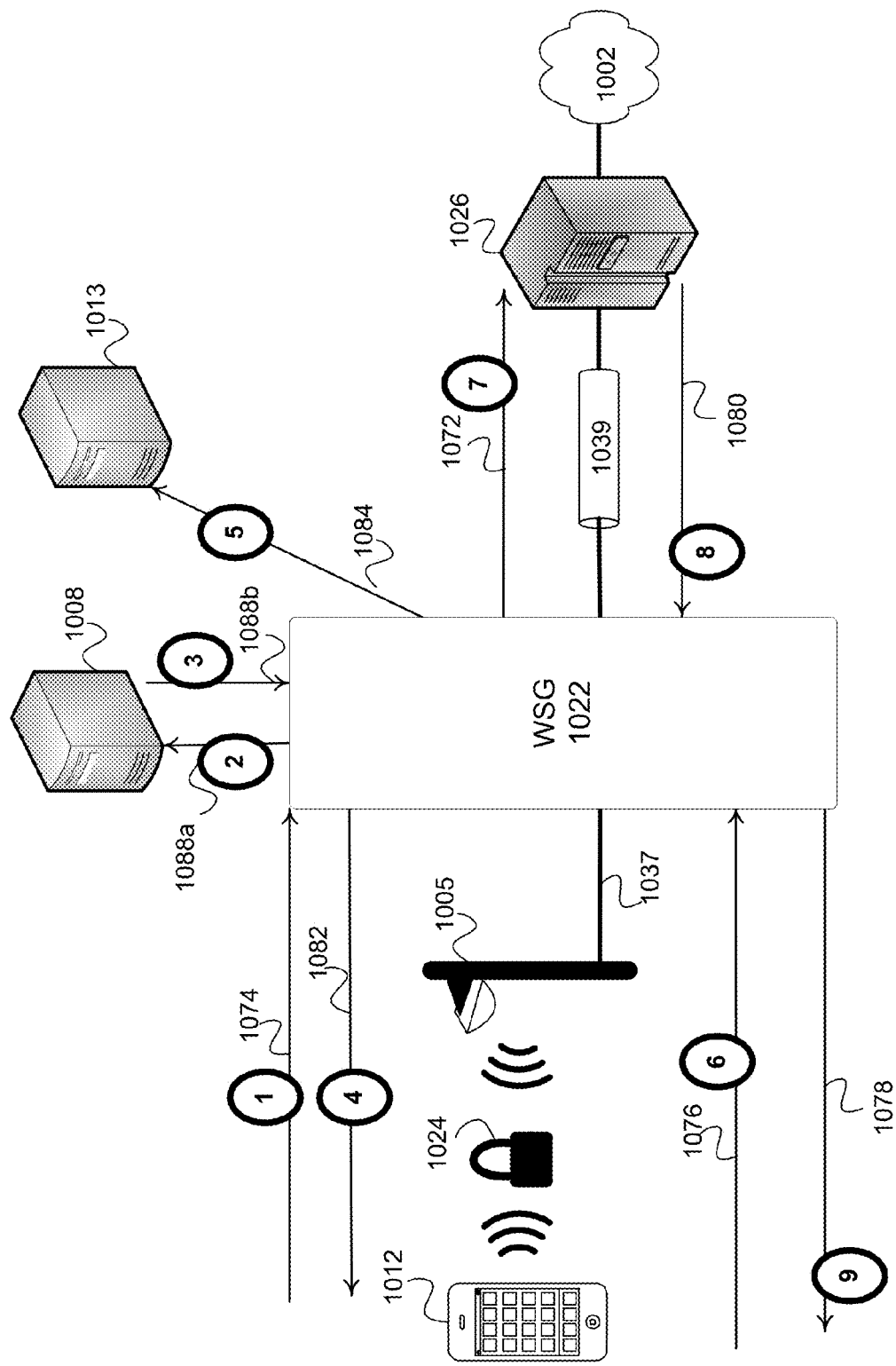
FIG. 10 is an alternate embodiment of FIG. 8 except the Wireless Services Gateway communicates with a policy server for the authenticated UE, according to some embodiments.

FIG. 10 Third Authentication Alternate Embodiment: WSG with Integrated PCRF

FIG. 10 is another example of a system-level diagram of the steps illustrating operation of the WSG according to some embodiments where policy control functionality can be integrated into the WSG. FIG. 10 includes communication with a Policy Server 1013 to query policy rules for an authenticated UE 1012. These policy rules can be available to the AP 1005 and the WSG 1022 to use for controlling UE 1012 data traffic. This alternate embodiment could be used with either system where the WSG acts as a Proxy server for the APs 605 or as a Radius server without the use of a Proxy server.

For example, in 3G technology, a Policy Server 1013 may be a Policy Control Rule Function (PCRF server). It could be another policy server to be used with future technologies. Policy rules may be for example, specific to that particular UE's subscription or user level agreement with the provider. For instance, the policy server 1013 may contain information about the UE's session time, speed, particular URLs to go to, specific traffic, and VPN traffic, etc. This policy information can be used by the AP 1005 and/or the WSG 1022 to control any or all aspects of the UE's communications (for example, a policy may limit the speed that a particular UE is permitted to operate). In some embodiments, one or more of these policy rules can be communicated to and implemented in the AP 1005. This can, for example, reduce the amount processing required for implementing such rules from the WSG 1012. In some embodiments, this can result in a linearly scaling of the number of UEs that a WSG can support.

In some embodiments, an AP can perform packet tagging of the communications from the UE to the WSG 1022 based on a number of different factors, such as UE's status and type of traffic that the communication represents (one type of traffic, for example, could be video). The tagged communications can be handled by WSG's without the WSG having to make a determination of the type of traffic as it comes through the WSG, for example, by using a table which could be keyed off of the tag accompanying the traffic. For example, for a UE that needs to be authenticated by Extensible Authentication Protocol Method for GSM Subscriber Identity Module (EAP-SIM) or EAP Transport Layer Security (EAP-TLS), the AP 1005 can handle the 802.1X/ RADIUS authentications, and remember a client as being authenticated by EAP-SIM or EAP-TLS. The traffic from the US is tagged by the AP 1005 as been authenticated by certain type, e.g., EAP-SIM. Upon receiving the packet tagged as been authenticated by EAP-SIM, the WSG 1022 can take appropriate action such as relaying a DHCP discover request to a specific DHCP server or cause a GTP-U tunnel to be created without utilizing per UE determination in the WSG.

In some embodiments, policy rules obtained from a PCRF server (for example, by Step 5 illustrated in FIG. 10), for can determine how the traffic should be tagged. Similarly, per user policy rules may be communicated to the APs 1012 and tagging can be handled by the AP, which can reduce or eliminate the need to maintain a per UE policy table at the WSG 1022. In some embodiments, per class policies rules can be enforced at the WSG 1022.

The tagging mechanisms described herein can be used in the WSG architecture to forward other UE 1012 attributes in the packet forwarding path. One example of this use is for the AP 1012 to tag a packet with certain location information. This can provide an efficient way of dynamically relaying the UE 1012's location to the WSG 1022. The WSG 1012 can utilize such location information to affect packet forwarding decisions as well as enabling other per UE targeted features which could be based on location and/or traffic types. Traffic type information can be available as a result of packet classification, is described in more detail below.

In some embodiments, location information could be utilized, for example, to provide one or more of the following, including but not limited to, location based rate limiting, location based access control, location based valued added services, location based billing and charging, location based advertisements.

Furthermore, location type information such as indicating a coffee shop, an airport, or other location indicating the origination of UE traffic can be embedded in a location tag so that venue-based policy could be applied to UE traffic from the same venue type. In some embodiments the words venue and location are used interchangeably. One venue example could be that UEs in every Starbucks coffee shop in the city could enjoy 30 minutes free Internet access.

Figure 11:
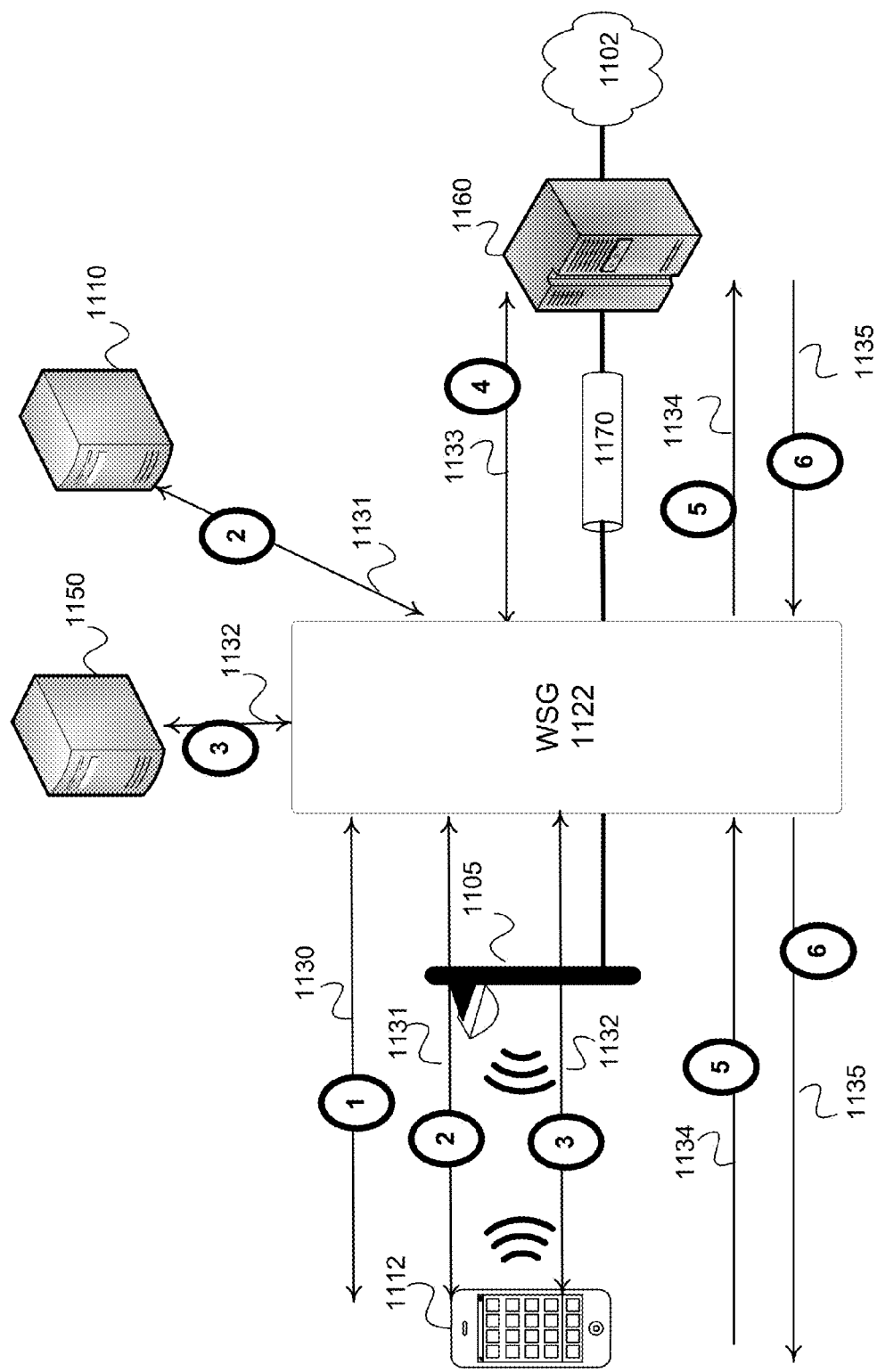
FIG. 11 is an illustration of an example authentication using Network Address Translation, according to some embodiments.

FIG. 11 Fourth Authentication Alternate Embodiment: WISPr/TTG Seamless Integration In some embodiments, the WSG can enable standard-based Web-based authentication to gain access to an MNO cellular network. The WSG can provide IP address allocation, Web-based authentication, and forwarding traffic to an MNO core network as illustrated in FIG. 11.

The Wireless Internet Service Provider: Roaming (WISPr) protocol can allow a Wi-Fi client can authenticate itself with a Web Portal page. The Wi-Fi client can first acquire its IP address via DHCP with or without going through 802.1X authentication over Wi-Fi. After obtaining an IP address, the client can start browsing a web page by sending HTTP request to its intended web server. The HTTP request is redirected by either AP 1105 or WSG 1122 to a Web portal server 1110 in an MNO's core network for authentication. The client can be presented with a Web page to let user supply authentication information such as the user name, password, and other information. The authentication information supplied by the US 1112 is forwarded to AP 1105 or WSG 1122. Then, AP 1105 or WSG 1122 can send the authentication requests to an MNO's AAA server for authentication. In some embodiments the WSG can act as a AAA Server for authentication purposes.

Fourth Alternate Embodiment Continued: with Network Address Translation (NAT)

In some embodiments, the WSG can provide Network Address Translation (NAT) as illustrated in FIG. 11.

STEP 1 is labeled 1130 and shows communications between UE 1112 and WSG 1122 via AP 1105. The UE's IP address can be provided by AP 1105 or WSG 1122 using a standard DHCP protocol, for example.

STEP 2 is labeled 1131 and illustrates that UE 1112 attempts to use the DCHP-assigned IP address to access the Internet 1102 but the traffic is redirected to a Web Portal Server 1110 in MNO core network.

STEP 3 is labeled 1132 and indicates that the UE attempts to authenticate with an authentication server 1150 in the MNO core network via WSG 1122. If a UE fails to be authenticated, the WSG can optionally revoke the DHCP lease to the client. In this embodiment, a GTP tunnel is not required since the UE has failed the authentication.

STEP 4 is labeled 1133 indicates WSG 1020 establishing a data tunnel 1170 with GGSN, Packet Data Network Gateway (PGW), or Home Agent (HA) 1160 in MNO core network and acquiring an IP address for the client. WSG 1122 can maintain a relationship between the UE's DHCP-assigned IP address and the UE's address assigned by a GGSN, PGW or HA 1160. Accordingly, the WSG 1122 can provide network address translation between the two.

STEP 5 is labeled 1134 and indicates that, upon receiving a packet from UE 1112, WSG 1122 changes the source IP address of the packet to the IP address assigned by GGSN, PGW, or HA 1160, and encapsulates the packet in the data tunnel 1170 and forwards it to GGSN, PGW, or HA 1160. The packet can eventually go to the Internet 1102.

STEP 6 is labeled 1135 and indicates that, upon receiving of a packet from GGSN, PGW, or HA 1160, WSG 1122 decapsulates the packet, and replaces the destination IP of the decapsulated packet with the DHCP-assigned IP address for the UE. WSG 1122 then sends the decapsulated/replaced IP packet via AP 1105 to the UE.

Figure 12:
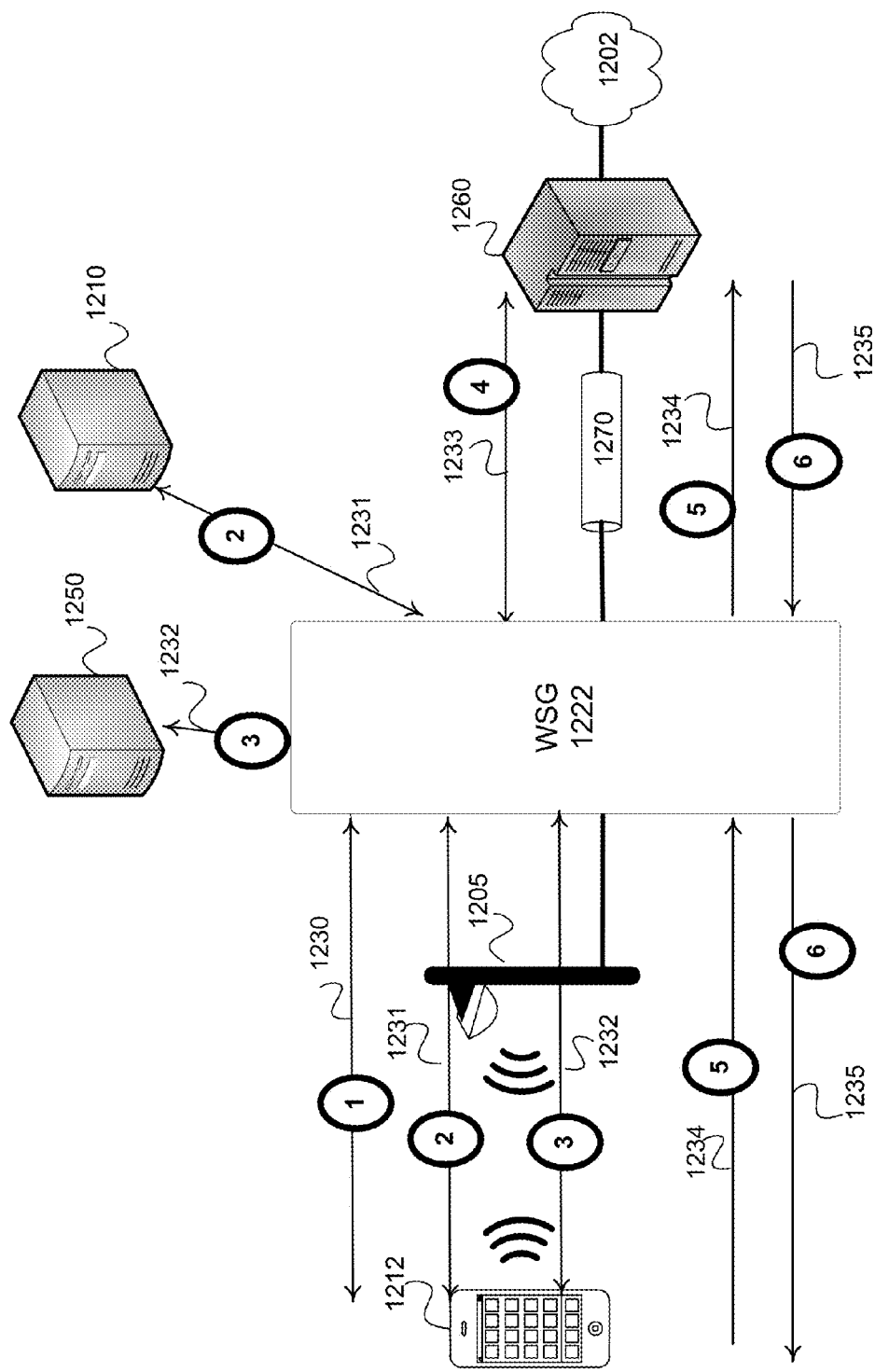
FIG. 12 is an illustration of an example authentication without using Network Address Translation, according to some embodiments.

FIG. 12 Fifth Alternate Authentication Example Embodiment: Without NAT

FIG. 12 shows an embodiment that does not include NAT at WSG. In some embodiments, fewer computations are required as compared to a NAT implementation.

STEP 1 is labeled 1230 and indicates that WSG 1222 receives a DHCP request from UE 1212 and can assign an IP address from an allocated set of IP addresses that can be properly recognized at a GGSN, PGW, or HA 1260 in the MNO core network. In some embodiments, the WSG 1222 and server 1260 agree on the set of IP addresses in advance. In some embodiments, the WSG 1222 and server 1260 agree on the set of IP addresses when needed. The IP address assigned to the UE from the allocated set is sent to UE via the DHCP offer/acknowledge message. In some embodiments, there can be more than on allocated set of IP addresses, for example, each MNO may have a respective, allocated set of IP addresses.

STEP 2 is labeled 1231 and indicates that the UE 1212 attempts to use the assigned IP address to access Internet 1202 but the traffic is redirected to Web Portal Server 1210 in the MNO core network.

STEP 3 is labeled 1232 and indicates that UE 1212 attempts to authenticate using authentication server 1250 in the MNO core network via WSG 1222. If a US 1212 fails to be authenticated, WSG 1222 can optionally revoke the UE's DHCP lease.

STEP 4 is labeled 1233 and indicates that, after a UE 1212 is authenticated, WSG 1222 can establish a data tunnel 1270 with a GGSN, PGW, or HA 1260, by informing the GGSN, PGW, or HA of the IP address assigned to the UE 1212 by WSG 1222 from the allocated set, instead of requesting an IP address to be assigned by the GGSN, PGW or HA.

STEP 5 is labeled 1234 and indicates that, upon receiving a packet from UE 1212, WSG 1222 can encapsulate the packet to send to a GGSN, PGW, or HA without changing the source IP address in the data packet.

STEP 6 is labeled 1235 and indicates that, upon receiving a packet from a GGSN, PGW, or HA, WSG decapsulates the packet and sends packet to the UE 1212 without changing destination IP address in the data packet.

Figure 13:
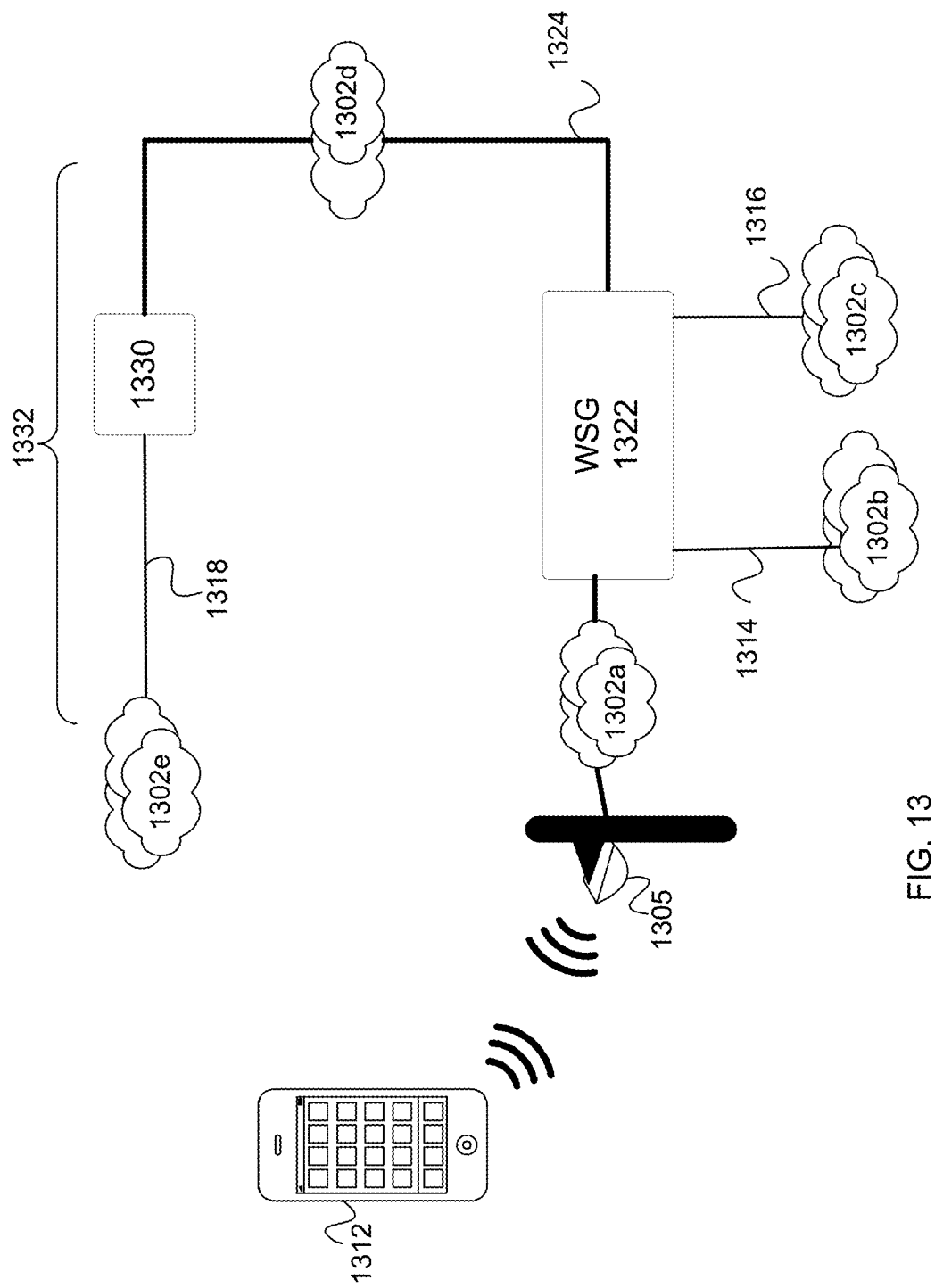
FIG. 13 is an illustration of use of the overall system, one embodiment of the Wireless Services Gateway's placement within the architecture of the carrier's network, according to some embodiments.

FIG. 13 Application of Alternate Policy Handling

As mentioned earlier, according to some embodiments, a WSG can affect data transmission using one or more MNO policies. FIG. 13 is an example illustration of a WSG's capability route data transmissions according to one or more policies. Some policy types can provide for handling of traffic based on certain things, including but not limited to, one or more of an the SSID, the traffic type, or UE information.

In this example embodiment, based on a particular SSID for example, the AP 1305 can transmit data from the UE 1312 over communication path to a network 1302*a* or any kind of connection to the WSG 1322. The WSG 1322 then contacts the appropriate wireless services core network 1332 over TTG communication path 1324 and through a network 1302*d* to the appropriate cellular core network 1332 and an applicable GGSN 1330. Here, the policy server PCFR (note shown), the authentication server AAA (not shown) and the Data Service Gateway (not shown) for instance, communicate with the WSG 1322 regarding the particular UE 1312.

In some embodiments, the kind of traffic can result in certain, and possibly different routes. For example, data traffic could be divided by SSIDs. Data traffic associated with a particular SSID could be routed through 1322 to an AP breakout to the internet 1302*b* without having to travel through network 1302*d*. In some embodiments, this can reduce the amount of traffic required to be transmitted through network 1302*d*. This can be for particular kinds of transmissions according to a particular SSID as dictated by the policy server and core network 1332 for example, YouTube.com or Facebook.com that is not metered by policies. In some embodiments, this can be traffic which may be determined as not needed to be passed through the WSG for analysis or processing.

Another set of transmissions 1316 can be routed through the WSG 1322's breakout 1302*c* without having to travel through network 1302*d*. In some embodiments, this can reduce the amount of traffic required to be transmitted through network 1302*d*. These decisions could be based upon traffic type, for example, heavier data usage, such as for video traffic on YouTube or Facebook, could be routed this way. Still a third set of transmissions, could be routed through the cellular core network 1332 and then 1318 to the internet 1302*e*. In some embodiments, this could be anything not routed through the other two breakouts. In some embodiments, this can be traffic on which the MNO desires to provide enhanced services (non-limiting examples could include advertising, or pay-per-view or metered traffic at a higher cost). Thus, according to the policies of the cellular core network, different transmissions types can be handled according to different infrastructure capabilities and the underlying policies on how to handle the different traffic.

To support differentiated services for various UE devices that are connected to SSIDs, WSG 1322 can obtain one or more policies on how to handle the traffic coming from and going to the UE devices based on one or more of, including but limited to, the accessed SSID, the location of the UE device, the type of UE device, authentication results with a AAA server, from a configuration of the WSG 1322, or from a PCRF server. In some embodiment, a non-limiting example could be that a PCRF server may dictate that a UE's traffic should not exceed 10 Mbps toward the UE device, and should not exceed 1 Mbps toward a GGSN. In another non-limiting example, a PCRF could specify a policy requiring Deep Packet Inspection (DPI) by the WSG 1322 to restrict YouTube video traffic to no more than 1 Mbps, and to be forwarded to local breakout 1316 toward 1302*c*. In yet another non-limiting example, a policy could constrain the bandwidth of client device by the usage such as less than 1

Mbps if exceeding 2 GB in a month, for example. One or more policies could be applied at a given time to more or more data streams.

In some embodiment, WSG 1322 can provide traffic breakdown statistics. Graphical representations such as a pie chart could be used as an example to show UE breakdown usage according to what data was transmitted where, such as to YouTube, SSID-A, Facebook, etc. This information may even be communicated from the WSG 1322 to a Network Management Console for display and analysis.

Figure 14:
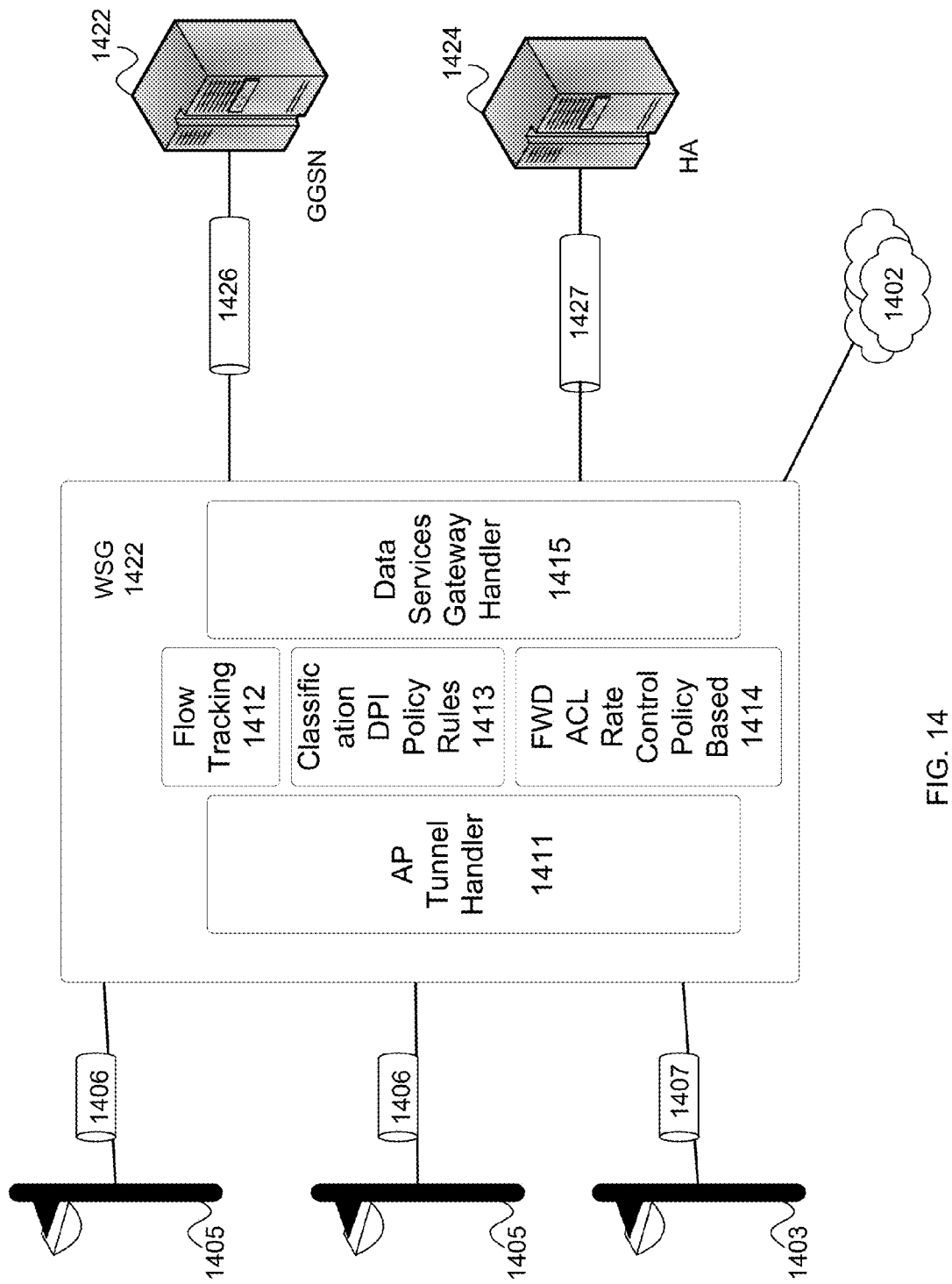
FIG. 14 is an illustration of the Data Plane of the Wireless Services Gateway (WSG), according to some embodiments.

FIG. 14 Example WSG Data Plane Architecture

Referring to FIG. 14, an example of the WSG Data Plane architecture is shown according to some embodiments. This non-limiting example can include several packet processing functions: AP Tunnel Handler (1411), Flow Tracking module (1412), Classification, DPI and Policy Rules module (1413), Forwarding module (1414), and Data Service Gateway (DSG) Handler (1415). The AP Tunnel Handler can serve as a tunnel endpoint for Type 1 APs (1405) and Type 2 APs (1403), where each type of AP could be from a different AP vendor. In addition to carrying UE traffic, an AP tunnel (1406) packets could also include control information, or tags as described above, to facilitate packet classification and forwarding at the WSG 1422. The Flow Tracking module 1412 can track UE sessions (e.g., TCP/IP) and flows. The Classification module 1413 can be responsible for classifying and identifying UE traffic and service types, which in some embodiments can be associated with providing quality of service functions (e.g., traffic types, bandwidth limitations, time of day policies, etc.), utilizing the control information (tags) from the tunneled packets as appropriate. Forwarding policies and rules can be applied based on how the UE traffic is classified. Traffic classification can be applied per flow-session. In some embodiments, classification of traffic is only determined on a limited number of packets in the beginning of a session. In some embodiments, the detailed analysis processing for classifying traffic is not in the data path, and therefore doesn't affect packet forwarding performance. The WSG Data Plane architecture is designed, in part, toward keeping packet processing time substantially or near-substantially constant regardless of the amount of analysis and quality of service treatment needed. Additionally, future quality of service features could be added with minimal impact on the packet processing time.

In some embodiments, another feature of this type of implementation architecture is that the WSG data plane performance is linearly scalable to the underlying hardware CPU speed (that is, for example, additional features can be added without the requirement of faster hardware components for a given packet processing bandwidth). Through this architecture, WSG can substantially reduce reliance on the performance of the hardware to help with ACL lookup, DPI lookup, and many other QoS decisions.

Data Plane Operations

FIG. 14 also illustrates an example of the WSG data plane operation according to some embodiments. As described above, policies can be determined and communicated to an AP 1405, during for example, UE authentication (e.g., based on one or more of the UE, the traffic type, and so on). UE data packets that are to be handled by the WSG (this would exclude local breakout packets at the AP), are forwarded to the WSG via various tunnel protocols, including the non-limiting examples or Generic Routing Encapsulation/User Datagram Protocol (GRE/UDP) (1406), QinQ (1407), and Internet Protocol Security (IPSEC). APs 1405 can tag on the per UE service class and forwarding policies as control information when sending the UE packet through the tunnel 1406 to the WSG 1422. On receipt of these encapsulated packets at the WSG 1422, the packet is stripped of the tunnel-header encapsulation, and decrypted back to the original UE packet.

The packets can then be subjected to various processing at the WSG 1422 including classification based on one or more policy rules and Deep Packet Inspection (DPI) (1413). Policy enforcement can include filtering (ACL) and quality of service (QoS) treatment (such as rate limiting, traffic equalization) can then be applied at Forwarding module (1414). The forwarding decisions (for example, to where the WSG should send the data packet next) can be determined based on classification results and policies. In some embodiment, the next forwarding location could be, for example, a data service gateway (such as GGSN) (1422), a Home Agent (for PMIP traffic) (1424), optionally via tunnel 1427, or break out to the Internet at the WSG (1402). In some cases, the packet may need to be encapsulated depending on the requirement of the next hop gateway. For example, if the next hop gateway is GGSN 1422, the packet can be GPRS Tunneling Protocol (GTP) encapsulated (1426). In some embodiments of the WSG data plane architecture in FIG. 14, the latency of a packet going through the system can remain constant regardless the number of QoS and/or policy treatments applied to a packet. An feature of this architecture is that, in comparison to other data plane architecture, WSG data plane performance can be linearly scalable to the underlying hardware speed.

Figure 15:
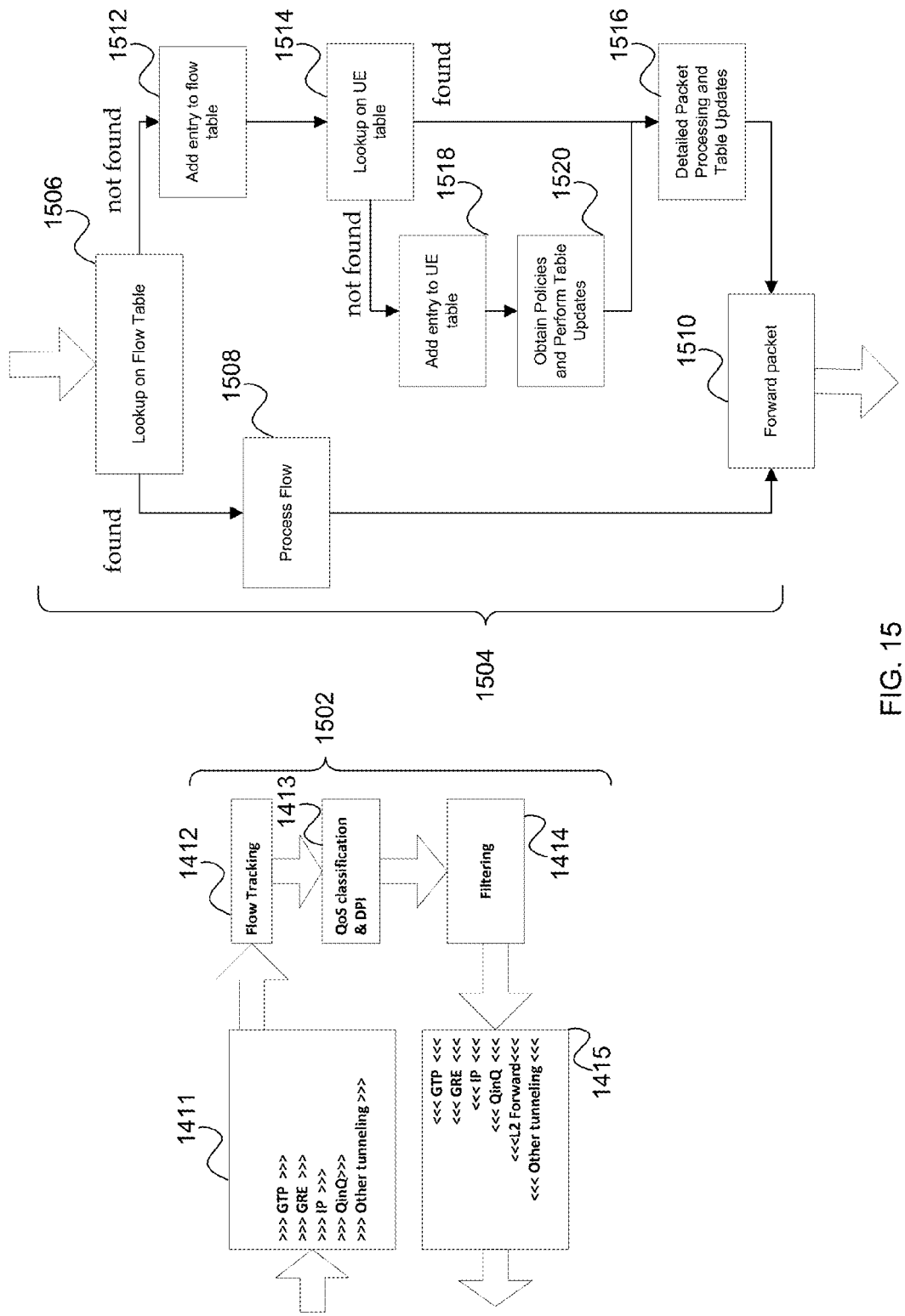
FIG. 15 illustrates Detailed Packet Handling in WSG Data Plane, according to some embodiments.

FIG. 15 Data Plane Examples, Detailed Packet Handling in the WSG Data Plane

FIG. 15 illustrates examples of detailed packet handling in the WSG Data Plane according to some embodiments. Flow 1502 generally illustrates packet processing steps through the WSG as described above where the text description in the boxes in flow 1502 correspond roughly to the activities performed in the like numbered boxes of FIG. 14. Flow 1504 generally illustrates in more detail Flow 1502.

For traffic coming into the WSG, packets can be received from an AP in a GRE tunnel, including a GRE header and an inner packet (that is, the actual UE packet). The inner UE packet can be encrypted if encryption is used. Once the inner UE packet is retrieved (and decrypted if necessary) by the AP Tunnel Handler 1411, a flow key can be prepared from the internal UE packet header by Flow Tracking module 1412. The key can be any combination of source MAC, source IP address, destination IP address, IP protocol value (e.g. TCP/UDP), layer 4 source port, layer 4 destination port, etc. Layer level generally refers to the 7-layer open system interconnect description of network functionality. The key can be used to find a hash entry, for example by hashing the key and using the hashed value to do a table look up in a data structure, that has the recorded in it UE information (including forwarding rules, service class, specific network port etc.) by the Flow Tracking module 1412 (see Flow 1504, box 1506), such that the UE packet can be processed (see box 1508) and transmitted out of WSG directly and quickly by the DSG Handler 1415 (see box 1510). In some embodiments, a flow can be considered a stream of data which can be identified by a source IP address, destination IP address, IP protocol value (e.g. TCP/UDP), layer 4 source port, layer 4 destination port, for example. In some embodiments, a connection can be comprised of multiple flows. A single UE can initiate or cause to be initiated multiple flows. Each flow can be associated with a same or different traffic type.

If a hash entry is not found, then an entry will be added by Flow Tracking module (1412) to the flow table (see flow 1512, box 1512). The inner packet's egress information (for example, a network output port of the WSG) is determined via a bridge table output operation (for example, via a layer 2 port lookup) and transmitted by DSG Handler 1415 through the applicable output port. The network port information can be stored into the hash entry in the flow table for later use. In this embodiment, a next inner packet received by the WSG having the hash key can have the egress path information in the entry in the flow table when looked up by DSG Handler 1415.

A lookup can then be made on the UE in a UE table (see box 1514), if the UE has an entry in the table then detailed processing of the packet and table updates (e.g., the flow table and/or the UE table) can occur (see box 1516). If on the other hand, a UE lookup does not find an entry in the UE table, then an entry to the UE table can be made (see box 1518), the WSG can obtain the policies from MNO that can be applied to the UE and update entries in the flow table and/or UE tables to reflect those policies (see box 1520)

The following describes exemplary detailed processing for a packet which could be performed, for example, in box 1516. Data packets can be received either in a tunnel or non-tunnel format, and a destination MAC lookup can be performed to determine an egress GRE tunnel by AP Tunnel Handler 1411 A route table lookup can be performed to get the next hop information for preparing a GRE header. An ARP table is can be queried up to get an associated MAC address for the GRE header as well. Once the GRE header is prepared on top of the raw IP packet, the packet can be send out the applicable egress port. During these packet processing steps, classification, QoS, access control list processing, policy, forwarding decision results can be recorded to the UE flow table entry along with other steps as desired. Specifically, when a raw IP packet is received, the flow hash key can be quickly prepared from the internal packet header. Like previously described, the key can be any combination of destination MAC, source IP address, destination IP address, protocol value, layer 4 source port, destination port, etc. This key can be used to find a hash entry that has the recorded egress path information (e.g., the network output port of the WSG), such that the raw IP packet can be encapsulated with the appropriate GRE header and encrypted (if desired) and transmitted to the egress port directly and quickly (see, for example, box 1508). The egress path information can be updated in the flow tables for use in processing subsequent packets.

Accordingly, the normal path for a first packet in a flow if along the "not found" path form the box 1506, with all forwarding decisions and table lookup results of the 1$^{st}$ packet being recorded in the UE and flow tables. For subsequent packets in each data flow, the processing steps will be much simpler: find the flow entry from the key (1506), perform processing on the flow according to the flow table entry (1508) (which might also include applying QoS markings), and then encapsulate the packet based on the information in the flow table entry and send the packet directly to egress interface (1510). Of course, a decision could be made to drop a packet in box 1508 and then box 1510 would not be performed.

Figure 16:
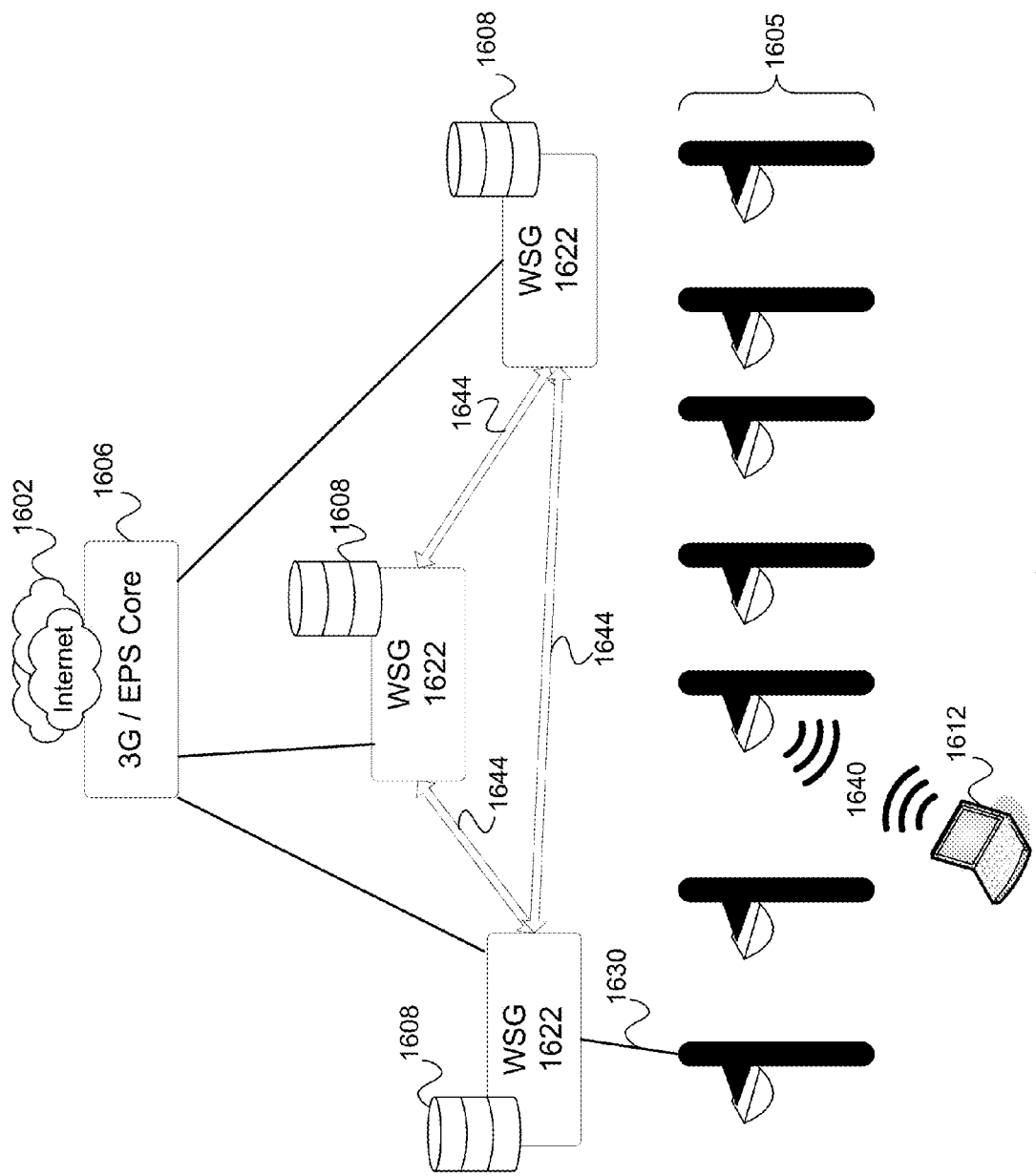
FIG. 16 is an illustration of the WSG to Access Point and WSG to WSG Interactions, the distributed database architecture coupled to the access point architecture, according to some embodiments.

FIG. 16 Scalability Examples

FIG. 16 is an example illustration of the scalability of the Wireless Services Gateway system according to some embodiments. This is depicted by showing representative wireless connections 1640 between UEs 1612 and access points 1605. The APs 1605 are depicted as many radios to indicate that many of them can be assigned to communicate with just one WSG 1622 over communication path 1630. Any AP can be used here, for example. Although only one 1630 is illustrated, other connections 1630 could be made to various WSG 1622s.

An example scalability embodiment of the system is depicted in FIG. 16 by showing numerous WSGs 1622 with their associated distributed databases 1608. These WSGs can form a "cluster" over the distributed database, thereby allowing for redundancy and fail-safe operations. One example of a distributed database that can be used is a Cassandra distributed database system.

Each WSG 1622 can be assigned to communicate with one or many access points 1605. Many WSGs 1622 can be assigned within the network to compound the number of access points that are can be used. The telecommunications core network 1606 is depicted connecting the WSGs 1622, and the overall Radio Access Network (RAN) with the internet 1602. In some embodiments the Radio Access Network can encompass all of the access points 1605, the WSGs 1622 and their associated distributed databases 1608 along with all of the other radio access network connections 1630.

The WSGs 1622 and the distributed database 1608 can be customized to support mobile operator needs. There may be requirements, for example, to support large volume of statistics, events, report generation, and monitoring requirement. The demands of supporting higher capacity over time can mean that the overall system should scale well in supporting initial small scale deployment, and an eventual large scale deployment (with 10s to 1000s times of increasing volume) over a period of time.

The management of WSGs 1622 can also run the management of the entire cluster of WSGs P22 by permitting a user to log into one of the WSGs 1622, and have the ability to configure, monitor, and manage the entire cluster of WSGs 1622 and the associated APs 1605.

A linear scalability of WSG 1622 can be due to various factors that can distribute loads of the overall system evenly or as desired onto available resources to perform such activities such as storage, management, control, and packet processing. The distributed database 1608 can allow APs 1605 and WSGs 1622 to store configuration information, events, statistics, logs, and many other information into the storage in a distributed manner, in particular, each AP 1605 can receive configuration information and reports statistics/events via associated WSGs 1622. When reading from and writing to the distributed database 1608, the requests can be distributed among the distributed database 1608 based on the underlying algorithms.

For example, a Cassandra Database can an example of a distributed database 1608. The distributed database can be any distributed database including Cassandra or NoSQL as non-limiting examples. The database 1608 can be partitioned into tables (or column families using Cassandra's terminology). Each table may contain multiple rows, and each row may contain a set of columns and associated values. Given a column family, the column name and other attributes, a distributed hashing algorithm can be used to determine which instance of the distributed database 1608 should be written to and read from. This distributed hashing algorithm can allow the Cassandra Database to be linearly scalable in retrieving and updating any information in the WSG's distributed database.

The WSGs 1622 can communicate among one another using paths 1644 to facilitate the communication of the distributed database 1608.

The distributed nature of WSG 1622s can support inherent resilience and redundancy. APs 1605 can select among multiple WSGs 1622 to be managed and forward traffic with links 1630. A failed link 1630 or a WSG 1622 may not impede the service of APs 1605 to client devices 1612 because APs 1605 can select other links 1630 or other WSGs 1622 to continue normal services to client devices 1612. Furthermore, the distributed database 1608 can allow WSGs 1622 to have a same or similar view of the entire network, that is, WSGs 1622 can share the same configuration information, statistic, events, logs, etc. To prevent failure of any instance of the distributed database 1608, the distributed database can support replication of the same piece of information onto multiple databases 1608. Since each piece of information can be stored in multiple instances of 1608, the overall system can naturally support redundancy against either node (e.g., WSG 1622 or some instance of distributed database 1608) or link (e.g., 1644 or 1630) failure.

The example WSGs 1622 here can collapse a traditional 3-tier architecture into a 2-tier one. In particular, the traditional 3-tier architecture consists of (1) APs 1605, (2) one or multiple controllers, and gateway functions, where the controllers perform management and control functions of APs 1605, and (3) the gateways support packet processing/integration with other equipment such as GGSN, Router, etc. The WSGs 1622 can support both controllers and gateway functions, removing the need for that specific tier.

The WSG embodiments herein can include both element management functions and network management functions in the same entity, which can allow the operators to support management of the entire network of APs and WSGs from single Web or command line (CLI) interface on a terminal.

The distributed database 1608 can also be implemented with cache memory to speed up overall system performance. For example, in some embodiments, Memcached can be employed in conjunction or to replace a disk-based storage (e.g., Cassandra Database) in the WSGs 1622.

APs 1605 can support local 802.11 handshake with UEs 1612, instead of utilizing a controller in a conventional AP 1605 plus controller environment. APs 1605 can update the WSGs 1622 when a UE 1612 is authorized, dis-associated, or other status updates as desired. The 802.11 handshake may also involve 802.1X. APs 1605 can locally perform 802.1X functions to authenticate a UE 1612 based on its credential (such as user name/password or physical device like SIM card).

To avoid excessive 802.1X processing, WPA and WPA2 standards have defined PMK scheme to verify whether UE 1612 have been previously authenticated, by exchanging the PMK credentials agreed among APs 1605 and UE 1612 in the earlier successful 802.1X authentication. The APs 1605 can update WSGs 1622 with the PMK credentials such that these credentials can be retrieved when UE 1612 move to different APs. Therefore, roaming among multiple APs 1605 can be effectively supported with APs 1605 and WSGs 1622.

The local 802.11 handshake capability of APs 1605 can allow the WSGs 1622 to increase the support of a much higher number of APs compared to a conventional controller.

APs 1605 can maintain a state machine of each locally visible UE P12, including, but not limited to, for example, whether a client has been authenticated, under authentication processing, dis-associated, the number of packets that have been sent and received. A conventional controller handles most of these state machines of client devices, which can negatively affect scalability.

The example where APs 1605 can maintain the state machines of each UE locally, the communication between APs and WSGs may be reduced. The result may affect performance and scalability in the overall network.

Communication (such as control, management, and data traffic) between APs and WSGs can be secured by authentication with credentials and encryption against spoofing. The management interfaces to WSGs can be physically isolated completely with dedicated physical interfaces or utilize Virtual Local Area Network (VLAN). The access to WSGs management interface can also secured by user credentials and can be encrypted.

The traffic of UEs can be routed or bridged onto local networks. The traffic can also be bridged into tunnels 1630 between APs 1605 and WSGs 1622. If tunnels 1630 are utilized, they can be optionally encrypted.

WSGs can seamlessly integrate with the 3G/EPS Core by supporting standard interfaces such as Gn and S2a/S2b interfaces toward GGSN and P-GW, respectively. WSGs can also be integrated with Routers, Switches, Broadband Remote Access Server (BRAS), and other possible network elements with protocols such as MPLS, L2TP, 16PoE, and many other possible choices.

WSGs 1622 can support standard-based routing and tunneling mechanism with other network elements. This can allow seamless integration with other network elements.

The tunnels between WSGs and APs can extend standard-based protocols to support specific features to enable efficient processing of UE traffic, for a non-limiting examples, an indication of a packet's WLAN of a UE, the type of traffic to be processed at WSGs and APs.

APs 1605 can support 802.1x authentication mechanisms as defined in the standard. To integrate with 3G and 4G network, one example choice of 802.1x could utilize EAP-SIM, EAP-AKA, EAP-AKA', or EAP-TLS as the authentication mechanism.

Still referring to FIG. 16, the WSG system can include a collection of WSGs 1622 joining together to form a cluster, providing Element Management System (EMS) and Network Management System (NMS) services to manage a massive number of APs 1605. The WSG system can scale horizontally by adding additional WSG nodes into the cluster.

WSG nodes can contain one or more Data Plane/s, the communication service module, as well as the EMS/NMS module to manage all the Wi-Fi Access Points discovered and associated with the system. Multiple WSG nodes can form a cluster, that virtually serves the network elements (Wi-Fi Access Points) as a single system.

APs 1605 can be distributed among multiple WSG nodes in a desired fashion, for example, evenly. Each approved AP 1605 can be associated with a preferred WSG 1622, and can attempt to communicate with this same node whenever possible. Each AP 1605 can also maintain a list of WSGs 1622, and can communicate to a different WSG when one fails to communicate with its assigned node. Data Planes can also communicate with WSG nodes through the communication service module.

Figure 17:
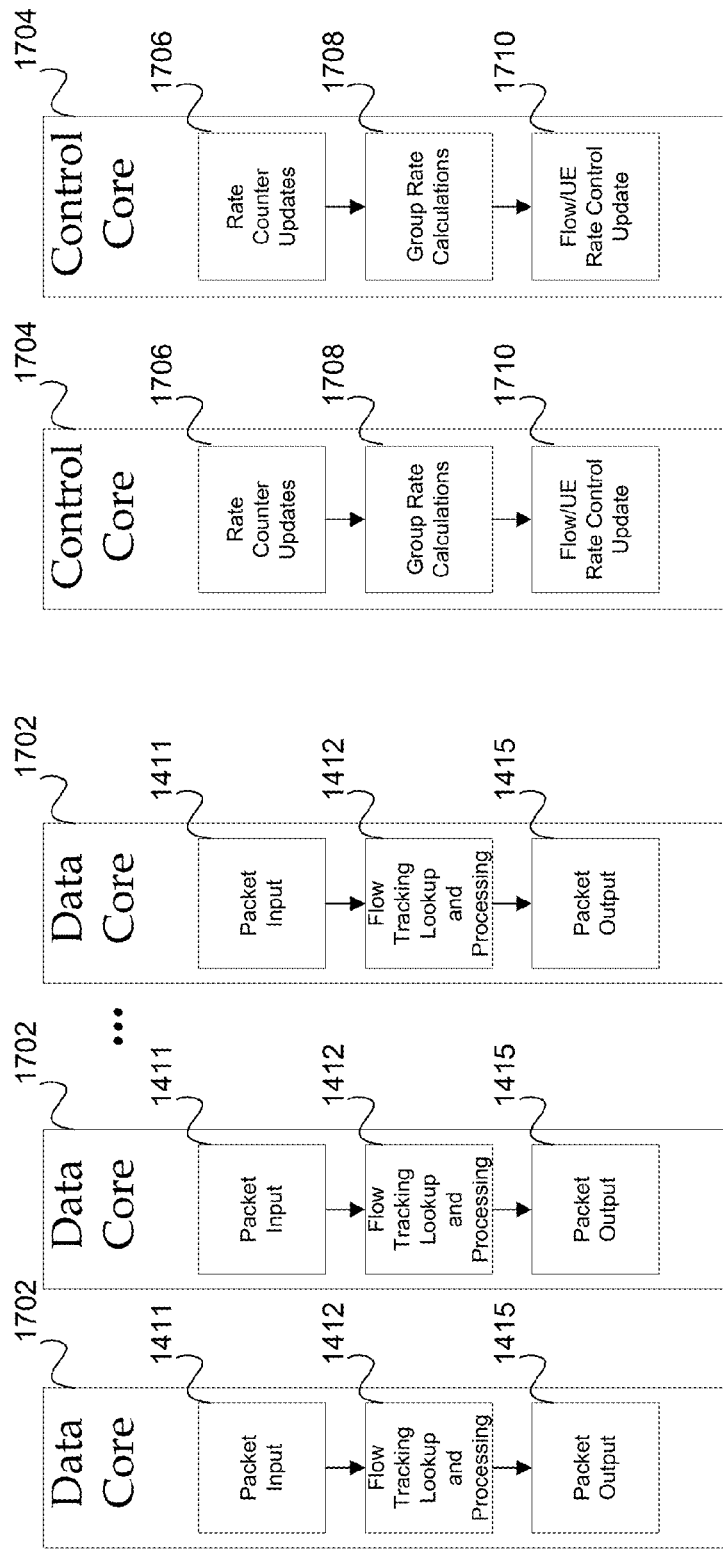
FIG. 17 is an illustration of an example using multiple core processors according to some embodiments.

FIG. 17 Scalability Examples

FIG. 17 is an another example illustration of the scalability of the Wireless Services Gateway system according to some embodiments. The WSG can include a number of processors which can include one or more processing cores in which processing can occur. In some embodiments, the WSG can be implemented on a blade server and the blade server can include any number of core processing units. Generally, in a multi-core, multi-processor environment, there are inherent overhead processing times required to deal with locking when common data structures are being updated by the various processors and/or cores. This could introduce packet forwarding delays when the data path requires updates to common data structure and has to block access to the common data structure. These delays can get progressively worse as the number of multi-processing units increases and/or the number of additional services or features to applied to the data paths increase.

In WSG's multi-core packet forwarding paths, this would have an impact in some tracking/policy enforcement function (e.g. rate control, bandwidth limiting, etc.). For example, per application (e.g. "youtube" traffic limit) rate-control functionality would require per-application rate updates. However, this can span multiple UE's with youtube traffic packets from different UE's being processed on different processor cores. What that implies is that each core would need to update the "youtube" packet counter and perform rate update calculations as "youtube" packets are being processed. That involves locking the counter(s) for update and potentially blocking other "youtube" packets being processed on a different core.

To achieve linear or near linear scalability, the WSG architecture can eliminate the requirement for locking any common data structures in the data path. All processing that requires updates to common structures (e.g. "youtube" rate counters and calculations) can be handled in the background utilizing one or more independent "control" cores.

In the "youtube" example, per flow counters can updated in the packet processing path. No locking is required since the system can determine that each UE flow is only handled by one processor. The rate-control function running in the control core(s) calculates and updates the overall "youtube" rate counters (as well as UE and other aggregate counters) based on the per flow rate updates.

Utilizing the latest rate information, rate control and other policy decisions are updated and stored in the flow and UE tables. For example, if it is determined that the rate limit for the time period has been exceeded, the forwarding decision in the flow entry can be updated to drop packets for that flow.

Similarly, a policy decision could be updated to apply certain QOS markings to the packets in the flow, which would also be stored in the flow (and/or UE) entry.

This can be illustrated using FIG. 17. Each data processing core 1702 can be a core that processes one or more flows. In some embodiments, a flow can be processed by the same core as described above to facilitate per flow locking of data relating to a single flow. During each processing, as described in more detail above, the basic processing occurs: a packet is received at the WSG (1411), a flow entry is looked up and the packet is processed according to the flow entry information (1412) and the packet is output (1415). These datapath steps, which translate to latency through the WSG, can be constant and scale to the number of processor cores available.

One or more control cores 1704 can be utilized such that the control cores can be used to lock and update common data structures used with multiple flows. For example, a control core 1704 can count and update counters associated with determining rates of traffic for various type of traffic (e.g., per traffic type, per UE, or any counter expressing a data rate) (see box 1706). This could be used for example, to control the rate or bandwidth for a single UE that has multiple flows spread out over a number of data cores 1702. A control core 1704 can perform group rate calculations (see box 1708) by for example, determining rates associated with various way to group data. For example, a group could be defined as a type of UE, a type of traffic across UEs, or other information that might be desired by the policies. Any number of different groups can be configured. The control core 1704 can then update any flow entry or UE entry to reflect any changes determined in 1706 or 1708. Items 1706 and 1708 are illustrative of the types of operations that can be performed in a control core 1704. Any operations that use counters, or common data structures to implement desired policies can be performed in a control core 1704 without affecting the basic data packet flow in a data core 1702.

Additional data cores 1702 can be added which can improve the number of flows which can be processed simultaneously without adding to the complexity of the control core's use of the shared data structures. As described more generally above, the shared data structures, flows tables, UE and the like can be stored in one or more of the Distributed Storage Device 432 and Distributed Memory Cache 434.

CONCLUSION

While the subject matter has been described in connection with a series of preferred embodiments, these descriptions are not intended to limit the scope of the subject matter to the particular forms set forth herein. To the contrary, the present descriptions are intended to cover such alternatives, modifications, and equivalents as may be included within the spirit and scope of the subject matter as defined by the appended claims and otherwise appreciate by one of ordinary skill in the art.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A system for integrating access point radios into a wireless service provider core network, comprising:
   a wireless services gateway including a processor, memory and date storage, the wireless services gateway configured to,
      communicate with at least one access point radio;
         wherein the access point radio is configured to communicate with at least one wireless user equipment;
      communicate with at least two wireless service provider core networks;
      communicate with at least one other wireless services gateway;
      access a distributed storage device that the at least one other wireless services gateway also has access to; and
      provide a communication connection between the at least one access point radio and a network.

2. The system of claim 1 wherein the wireless services gateway is further configured to allow the wireless user equipment to move among more than one access point radio and cellular antennae and maintain the network connection.

3. The system of claim 1 wherein the wireless services gateway includes a data log interface, configured to,
   communicate with the at least one access point radio data log interface;
   communicate with a local log; and
   communicate with an event handler.

4. The system of claim 1 wherein the wireless services gateway includes a communication service module, configured to,
   communicate with an access point configuration manager in the at least one access point radio;
   communicate with an access point status manager in the at least one access point radio;
   communicate with an association manager in the at least one access point radio; and
   communicate with a distributed memory core and the distributed storage device.

5. The system of claim 1 wherein the wireless services gateway includes a secure gateway,
   wherein the secure gateway is configured to communicate with the distributed storage device and at least one access point radio.

6. The system of claim 1 wherein the wireless services gateway includes interfaces with the access point which may exchange data relating to access point configuration, access point status, and initial discovery and association of the access point with the wireless services gateway.

7. The system of claim 1 wherein the wireless services gateway includes a tunnel termination gateway (TTG), configured to communicate data with a gateway general packet radio service support node (GPRS) in the provider core network and thereby a wide area network.

8. The system of claim 1 wherein the wireless services gateway includes a packet data gateway (PDG), configured to communicate data packets through a wide area network.

9. The system of claim 1 wherein the wireless services gateway includes an authentication/authorization/accounting (AAA) proxy configured to communicate user authentication information with an AAA server in the provider core network.

10. The system of claim 1 wherein communications with the AP is by a wireless services gateway initiated secure IPSec Tunnel.

11. The system of claim 1 wherein the wireless services gateway is configured to route data traffic through a local breakout to a wide area network.

12. A method for integrating access point radios into a wireless service provider core network, comprising:
via a wireless services gateway,
communicating with at least one access point radio;
wherein the access point radio is configured to communicate with at least one wireless user equipment;
communicating with at least two wireless service provider core networks;
communicating with at least one other wireless services gateway;
accessing a distributed storage device that the at least one other wireless services gateway also has access to; and
providing a communication connection between the at least one access point radio and a network.

13. The method of claim 12 further comprising, via a data log interface, included in the wireless services gateway,
communicating with the at least one access point radio data log interface;
communicating with a local log; and
communicating with an event handler.

14. The method of claim 12 further comprising, via the wireless services gateway, communicating with home subscriber server to authenticate the wireless user equipment.

15. The method of claim 12 further comprising, via the wireless services gateway,
receiving a Dynamic Host Configuration Protocol (DHCP) request from the wireless user equipment;
assigning an Internet Protocol (IP) address to the wireless user equipment; and
sending the assigned IP address to the wireless user equipment by a DHCP offer/acknowledge message.

16. The method of claim 12 further comprising, via the wireless services gateway,
routing data traffic, received from the wireless user equipment by the access point directly to the network by a breakout.

17. The method of claim 16 wherein the breakout is at the wireless services gateway.

18. The method of claim 16 wherein the breakout is between the wireless services gateway and the wireless service provider core network.

* * * * *